United States Patent
Singla et al.

(10) Patent No.: US 12,462,567 B2
(45) Date of Patent: Nov. 4, 2025

(54) PREDICTIVE ADJUSTMENT OF DISTRIBUTED SURVEILLANCE VIDEO DATA CAPTURE USING NETWORKS OF GRAPH MAPS

(71) Applicant: Sandisk Technologies, Inc., Milpitas, CA (US)

(72) Inventors: Lovish Singla, Bangalore (IN); Lovleen Arora, Bangalore (IN); Shaheed Nehal A, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 65 days.

(21) Appl. No.: 18/608,334

(22) Filed: Mar. 18, 2024

(65) Prior Publication Data
US 2025/0292580 A1 Sep. 18, 2025

(51) Int. Cl.
*G06V 20/52* (2022.01)
*G06V 20/40* (2022.01)
*H04N 23/90* (2023.01)

(52) U.S. Cl.
CPC ............. *G06V 20/52* (2022.01); *G06V 20/44* (2022.01); *H04N 23/90* (2023.01); *G06V 2201/07* (2022.01)

(58) Field of Classification Search
CPC .... G06V 20/52; G06V 20/44; G06V 2201/07; H04N 23/90
See application file for complete search history.

(56) References Cited

U.S. PATENT DOCUMENTS

| | | | |
|---|---|---|---|
| 7,583,815 B2 | 9/2009 | Zhang | |
| 7,697,827 B2 | 4/2010 | Konicek | |
| 8,824,879 B2 | 9/2014 | Konicek | |
| 9,031,847 B2 | 5/2015 | Sarin | |
| 9,560,323 B2 | 1/2017 | Huang | |
| 10,230,884 B2 | 3/2019 | Okada | |
| 10,643,472 B2 | 5/2020 | Song | |
| 10,701,321 B2 | 6/2020 | Westmacott | |
| 10,855,921 B2 | 12/2020 | Milne | |
| 10,885,342 B1 | 1/2021 | Day | |
| 10,897,627 B2 | 1/2021 | Muthiah | |
| 11,468,576 B2 * | 10/2022 | Rao | G06V 40/161 |
| 11,538,316 B2 | 12/2022 | Lee | |
| 11,619,991 B2 | 4/2023 | Kelly | |
| 2004/0257444 A1 | 12/2004 | Maruya | |
| 2005/0102133 A1 | 5/2005 | Rees | |

(Continued)

FOREIGN PATENT DOCUMENTS

| CN | 109300471 A | 2/2019 |
|---|---|---|
| JP | 2015104028 A | 6/2015 |

*Primary Examiner* — Boubacar Abdou Tchoussou
(74) *Attorney, Agent, or Firm* — Patent Law Works LLP

(57) ABSTRACT

Systems, video cameras, and methods for predictive adjustment of multi-camera surveillance video data capture based on a network of sub-region graph maps are described. Different groups of networked video cameras are deployed across a region and represented in sub-region graph maps based on the physical locations of the video cameras and interrelated through a master graph map. Each group of networked video cameras includes a master video camera able to connect directly and/or through a control center to the master video cameras in other groups to share video capture update messages in response to regional video alert events.

20 Claims, 9 Drawing Sheets

(56) References Cited

U.S. PATENT DOCUMENTS

| | | |
|---|---|---|
| 2005/0128311 A1 | 6/2005 | Rees |
| 2007/0236570 A1 | 10/2007 | Sun |
| 2008/0198231 A1 | 8/2008 | Ozdemir |
| 2009/0245573 A1 | 10/2009 | Saptharishi |
| 2009/0309973 A1 | 12/2009 | Kogane |
| 2010/0141767 A1 | 6/2010 | Mohanty |
| 2010/0157064 A1 | 6/2010 | Cheng |
| 2013/0036628 A1 | 2/2013 | Hussey |
| 2013/0208113 A1 | 8/2013 | Yoneji |
| 2013/0314543 A1 | 11/2013 | Sutter |
| 2014/0028826 A1 | 1/2014 | Lee |
| 2014/0160316 A1 | 6/2014 | Hwang |
| 2014/0192211 A1 | 7/2014 | Konicek |
| 2014/0333775 A1 | 11/2014 | Naikal |
| 2015/0172604 A1 | 6/2015 | Kim |
| 2016/0189500 A1 | 6/2016 | Kim |
| 2017/0127302 A1 | 5/2017 | Fersman |
| 2017/0221219 A1 | 8/2017 | Cho |
| 2018/0007323 A1 | 1/2018 | Botusescu |
| 2018/0013658 A1 | 1/2018 | Wiesmaier |
| 2018/0165520 A1 | 6/2018 | Meisser |
| 2019/0037178 A1 | 1/2019 | Larsen |
| 2019/0080575 A1 | 3/2019 | Lee |
| 2019/0104283 A1 | 4/2019 | Wakeyama |
| 2019/0156849 A1 | 5/2019 | Feng |
| 2019/0258865 A1 | 8/2019 | Ernesti |
| 2020/0005615 A1 | 1/2020 | Madden |
| 2020/0105111 A1 | 4/2020 | Messer |
| 2020/0234057 A1 | 7/2020 | Koo |
| 2020/0327347 A1 | 10/2020 | Arai |
| 2021/0201933 A1 | 7/2021 | Kang |
| 2021/0289168 A1 | 9/2021 | Glückert |
| 2021/0342619 A1 | 11/2021 | Faller |
| 2021/0374971 A1 | 12/2021 | Zhou |
| 2021/0409790 A1 | 12/2021 | Larrew |
| 2022/0171970 A1 | 6/2022 | Yadav |
| 2022/0215727 A1 | 7/2022 | Jeong |
| 2022/0292833 A1 | 9/2022 | Ardö |
| 2022/0383522 A1 | 12/2022 | Lai |
| 2022/0391090 A1 | 12/2022 | Muthiah |
| 2022/0406065 A1 | 12/2022 | Kang |
| 2023/0031871 A1 | 2/2023 | Shroff |
| 2023/0064558 A1 | 3/2023 | Griffin |
| 2023/0082600 A1 | 3/2023 | Nakazato |
| 2023/0156337 A1 | 5/2023 | Oh |
| 2023/0209204 A1 | 6/2023 | Zu |
| 2023/0252654 A1 | 8/2023 | Kamiya |
| 2024/0007744 A1 | 1/2024 | Muthiah |
| 2024/0155221 A1 | 5/2024 | Watanabe |
| 2024/0386581 A1 | 11/2024 | Kamada |

\* cited by examiner

PREDICTIVE ADJUSTMENT OF DISTRIBUTED SURVEILLANCE VIDEO DATA CAPTURE USING NETWORKS OF GRAPH MAPS

TECHNICAL FIELD

The present disclosure generally relates to video surveillance systems and, more particularly, to video surveillance systems configured to control video capture parameters based on other networked video cameras.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. In some configurations, video may be recorded in onboard memory of the cameras, with or without transfer to a server. Client or user systems are communicatively connected to the server system and/or cameras to request, receive, and display streams of recorded video data and/or related alerts and analytics.

An increasing number of video surveillance applications use object detection and recognition, such as facial recognition, based on discrete objects identified in a video stream. Due to the high cost of storage for surveillance applications, including continuous surveillance, video cameras may include features to selectively capture high quality video. For example, once an object, motion, or similar visual condition is detected, the camera may modify its video capture operations to capture high quality data. These modifications of video capture operations may include initiating data capture, such as where a light or motion sensor provides the visual condition, changing the video capture rate from a lower video capture rate to a higher video capture rate, moving the field of view of the camera using zoom and/or pan-tilt-zoom (PTZ) capabilities, and/or changing data storage destinations.

While such trigger conditions reduce video data usage, they may also delay object detection, miss fast moving objects, miss data objects that are more difficult to detect at lower capture rates, miss objects within PTZ range that do not cross a current field of view, and/or miss early portions of a video event of interest (which may include critical angles, lighting, or other image features to support object recognition).

Systems and methods for predictively modifying video capture operations for selective capture of objects of interest based on data from another networked video camera in the neighborhood may be advantageous. A reliable and efficient way of using video data from a networked video camera in the same region to initiate modification of video capture operations across different networked camera groups before an object is detectable in the field of view of those video cameras may be needed.

SUMMARY

Various aspects for predictively modifying video capture operations in a multi-camera video surveillance network comprised of multiple networked video camera groups, particularly using video data from one camera group to initiate changes in video capture parameters of another camera group based on a graph map of the spatial relationships among the groups of video cameras, are described.

One general aspect includes a system that includes a first video camera including a network interface configured for communication with a first plurality of networked video cameras, where the first plurality of networked video cameras includes the first video camera and a second video camera among a second plurality of networked video cameras. The system also includes at least one controller in communication with the first plurality of networked video cameras and the second video camera, the at least one controller configured to, alone or in combination: receive, based on a first graph map of the first plurality of networked video cameras, a first video capture update message from at least one video camera in the first plurality of networked video cameras; determine, based on the first video capture update message, a regional video alert event; and send, based on the regional video alert event, a second video capture update message to the second video camera, where the second video camera is configured to send, responsive to the second video capture update message and based on a second graph map of the second plurality of networked video cameras, a third video capture update message to at least one other video camera from the second plurality of networked video cameras.

Implementations may include one or more of the following features. The system may include the first plurality of networked video cameras, where each video camera of the first plurality of networked video cameras is configured to, responsive to receiving the first video capture update message: determine at least one event parameter from the first video capture update message; modify, based on the at least one event parameter, a video capture operation of that video camera in the first plurality of networked video cameras; and capture, using that video camera, video data based on the modified video capture operation. The system may include the second plurality of networked video cameras, where each video camera of the second plurality of networked video cameras is configured to, responsive to receiving the third video capture update message: determine regional video capture modifications from the third video capture update message; modify, based on the regional video capture modifications, a video capture operation of that video camera in the second plurality of networked video cameras; and capture, using that video camera, video data based on the modified video capture operation. The first graph map may include: a first coordinate position system; a first set of coordinates and a master indicator for the first video camera; a second set of coordinates for each other video camera in the first plurality of networked video cameras; and a third set of coordinates for each child node between video cameras of the first plurality of networked video cameras, where each child node is mapped to at least two parent nodes for corresponding video cameras of the first plurality of networked video cameras. The second graph map may include: a second coordinate position system; a fourth set of coordinates and a master indicator for the second video camera; a fifth set of coordinates for each other video camera in the second plurality of networked video cameras; and a sixth set of coordinates for each child node between video cameras of the second plurality of networked video cameras, where each child node is mapped to at least two parent nodes for corresponding video cameras of the second plurality of networked video cameras. The first coordinate position system and the second coordinate position system may be different. At least one video camera in the first plurality of networked video cameras may include a first object detector configured to detect a first object of interest in video data captured by that video camera; at least one video camera in the second plurality of networked video cameras may include a second object detector configured to detect a second object of interest in video data captured by that video camera; the first video capture update message may be responsive to detection of the first object of interest; the second video capture update message may include at least one parameter of the first object of interest; and the at least one video camera in the second plurality of networked video cameras may be configured to modify, responsive to the third video capture update message, at least one operating parameters of the second object detector to detect the first object of interest in the video data captured by that video camera. The second video capture update message may include at least one parameter selected from: a sample of video data for the regional video alert event; coordinates of the video camera in the first plurality of networked video cameras that captured the regional video alert event; and a direction of travel of an object of interest determined for the regional video alert event. The at least one controller may be further configured to, alone or in combination, determine the second plurality of networked video cameras and the second video camera based on the at least one parameter selected. The system may include: the first plurality of networked video cameras corresponding to a first sub-region mapped to first set of physical locations; the second plurality of networked video cameras corresponding to a second sub-region mapped to a second set of physical locations; and a third plurality of networked video cameras corresponding to a third sub-region mapped to a third set of physical locations. The first graph map is based on the first set of physical locations; the second graph map is based on the second set of physical locations; a third graph map corresponds to the third plurality of networked video cameras and is based on the third set of physical locations; and the at least one controller is further configured to, alone or in combination, select, based on the video regional alert event, between the second plurality of networked video cameras and the third plurality of networked video cameras to receive the second video capture update message. The at least one controller may be further configured to, alone or in combination: determine, based on the regional video alert event, a priority value of the regional video event alert; compare the priority value to at least one event priority threshold; and select, responsive to the priority value meeting at least one event priority threshold, at least one plurality of networked video cameras from a set of pluralities of networked video cameras including the second plurality of networked video cameras. The second video capture update message may include the priority value; and the second plurality of networked video cameras may be further configured to selectively modify, based on the priority value, video capture operations. The system may include a computer system remote from the first plurality of networked video cameras and the second plurality of networked video cameras, where the computer system may include: a plurality of graph maps corresponding to a plurality of sub-region sets of networked video cameras; a network interface configured for communication with a master camera in each sub-region set of the plurality of sub-region sets; and the at least one controller. The first plurality of networked video cameras may be a first sub-region set corresponding to a first set of physical locations monitored by the computer system; the first video camera may be the master camera for the first plurality of networked video cameras; the second plurality of networked video cameras may be a second sub-region set corresponding to a second set of physical location monitored by the computer system; and the second video camera may be the master camera for the second plurality of networked video cameras.

Another general aspect includes a computer-implemented method including: receiving, from a first video camera in a first plurality of networked video cameras and based on a first graph map of the first plurality of networked video cameras, a first video capture update message from at least one video camera in the first plurality of networked video cameras; determining, based on the first video capture update message, a regional video alert event; sending, to a second video camera in a second plurality of networked video cameras and based on the regional video alert event, a second video capture update message; and sending, by the second video camera and responsive to the second video capture update message, a third video capture update message to at least one other video camera from the second plurality of networked video cameras based on a second graph map of the second plurality of networked video cameras.

Implementations may include one or more of the following features. The computer-implemented method may include, responsive to receiving the first video capture update message and by at least one video camera in the first plurality of networked video cameras: determining at least one event parameter from the first video capture update message; modifying, based on the at least one event parameter, a video capture operation of that video camera in the first plurality of networked video cameras; and capturing, using that video camera, video data based on the modified video capture operation. The computer-implemented method may include, responsive to receiving the third video capture update message and by at least one video camera of the second plurality of networked video cameras: determining regional video capture modifications from the third video capture update message; modifying, based on the regional video capture modifications, a video capture operation of that video camera in the second plurality of networked video cameras; and capturing, using that video camera, video data based on the modified video capture operation. The first graph map may include: a first coordinate position system; a first set of coordinates and a master indicator for the first video camera; a second set of coordinates for each other video camera in the first plurality of networked video cameras; and a third set of coordinates for each child node between video cameras of the first plurality of networked video cameras, where each child node is mapped to at least two parent nodes for corresponding video cameras of the first plurality of networked video cameras. The second graph map may include: a second coordinate position system; a fourth set of coordinates and a master indicator for the second video camera; a fifth set of coordinates for each other video camera in the second plurality of networked video cameras; and a sixth set of coordinates for each child node between video cameras of the second plurality of networked video cameras, where each child node is mapped to at least two parent nodes for corresponding video cameras of the second plurality of networked video cameras. The first coordinate position system and the second coordinate position system may be different. The computer-implemented method may include: detecting, by at least one video camera in the first plurality of networked video cameras and using a first object detector, a first object of interest in video data captured by that video camera; and modifying, by at least one video camera in the second plurality of networked video cameras and responsive to the third video capture update message, at least one operating parameters of a second object detector to detect the first object of interest in the video data captured by that video camera, where the first video capture update message is responsive to detection of the first object of interest and the second video capture update message may include at least one parameter of the first object of interest. The computer-implemented method may include including, in the second video capture update message, at least one parameter selected from a sample of video data for the regional video alert event, coordinates of the video camera in the first plurality of networked video cameras that captured the regional video alert event, and a direction of travel of an object of interest determined for the regional video alert event; and determining, based on the at least one parameter selected, the second plurality of networked video cameras and the second video camera. The computer-implemented method may include selecting, based on the video regional alert event, between the second plurality of networked video cameras and a third plurality of networked video cameras to receive the second video capture update message, where: the first plurality of networked video cameras corresponding to a first sub-region mapped to first set of physical locations; the second plurality of networked video cameras corresponding to a second sub-region mapped to a second set of physical locations; the third plurality of networked video cameras corresponding to a third sub-region mapped to a third set of physical locations; the first graph map is based on the first set of physical locations; the second graph map is based on the second set of physical locations; and a third graph map corresponds to the third plurality of networked video cameras and is based on the third set of physical locations. The computer-implemented method may include: determining, based on the regional video alert event, a priority value of the regional video event alert; comparing the priority value to at least one event priority threshold; selecting, responsive to the priority value meeting the at least one event priority threshold, at least one plurality of networked video cameras from a set of pluralities of networked video cameras including the second plurality of networked video cameras, where the second video capture update message includes the priority value; and selectively modifying, by at least one video camera in the second plurality of network video cameras and based on the priority value, video capture operations.

Still another general aspect includes a system including: a first plurality of networked video cameras including a first video camera; a second plurality of networked video cameras including a second video camera; at least one processor; at lease one memory; means for receiving, from the first video camera and based on a first graph map of the first plurality of networked video cameras, a first video capture update message from at least one video camera in the first plurality of networked video cameras; means for determining, based on the first video capture update message, a regional video alert event; means for sending, to the second video camera and based on the regional video alert event, a second video capture update message; and means for sending, by the second video camera and responsive to the second video capture update message, a third video capture update message to at least one other video camera from the second plurality of networked video cameras based on a second graph map of the second plurality of networked video cameras.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve selective capture of surveillance video data by using video data from other groups of cameras in the region to trigger modifications of video capture operations based on graph mapped relationships among the video camera groups. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
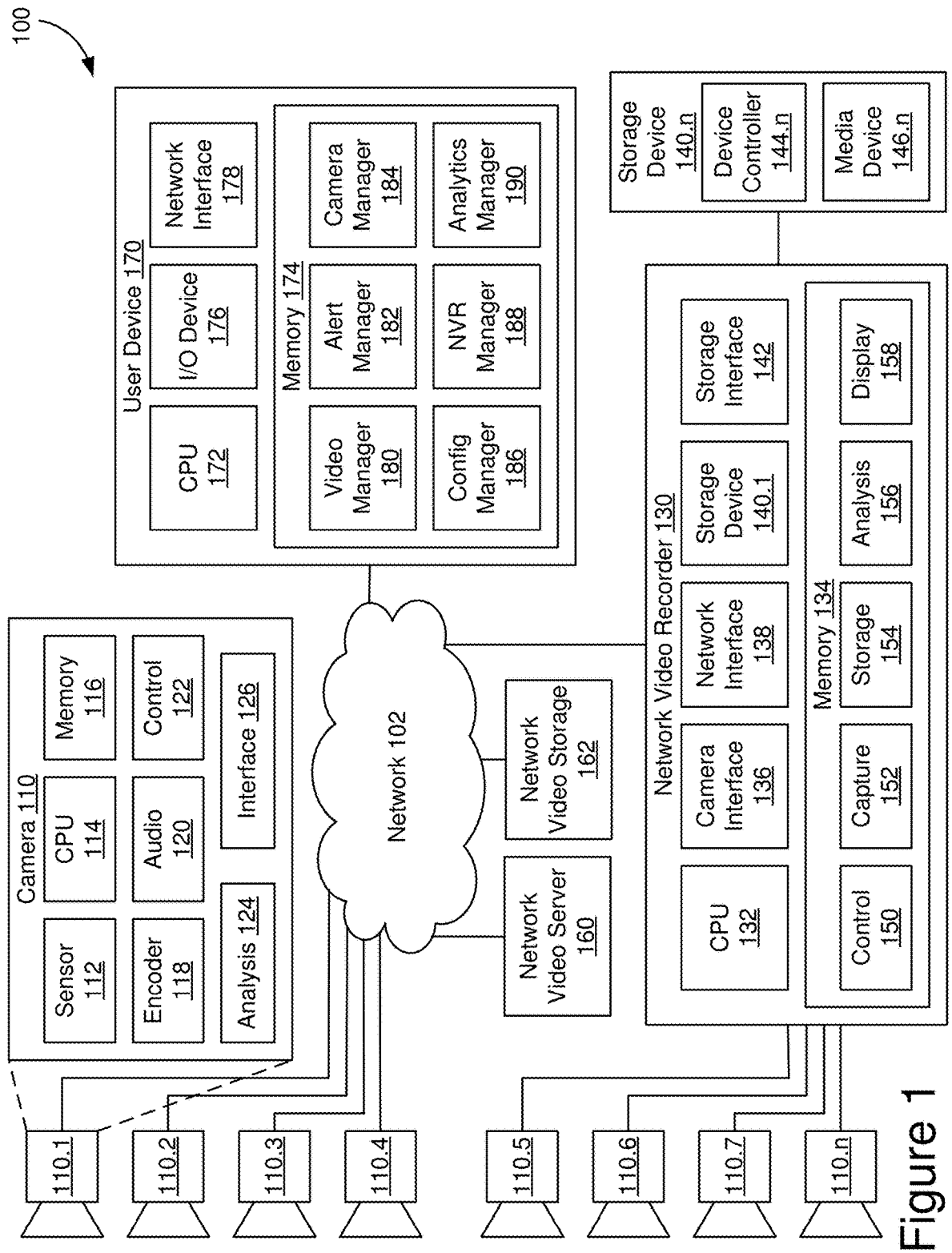
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded, synchronized, and/or independent audio streams with their respective video streams. In some embodiments, video cameras 110 may include an image sensor 112, a processor or central processing unit CPU 114, a memory 116, an encoder 118, an audio channel 120, a control circuit 122, and/or a network interface 126. In some embodiments, video cameras 110 may include onboard analytics, such as a video analysis subsystem 124. In some configurations, networked video cameras 110 may be configured in multiple groups, where each group is associated with a set of physical locations for a sub-region of the region being monitored. For example, video cameras 110.1-110.4 may be configured as a first group monitoring one sub-region while video cameras 110.5-110.n may be configured as a second group monitoring a different sub-region.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. In some embodiments, multiple image sensors are supported by the same circuit board and/or processing subsystem containing CPU 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats. In some configurations, the settings used by encoder 118 may be modified responsive to a video capture update message received by camera 110. Camera 110 may include audio channel 120 configured to capture audio data to be processed and encoded with image data in the resulting video stream and/or as an independent audio data stream.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion and/or audio detection, auto tracking, and similar features, and/or initiate video data streaming. In some embodiments, one or more systems may provide PTZ position control signals (and/or PTZ positioning commands converted to PTZ position control signals by control circuit 122) through the API. In some configurations, control circuit 122 may modify camera position or other features in response to a video capture update message received by camera 110.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support object detection, classification, and/or recognition. For example, video analysis subsystem 124 may receive the real-time video data stream from sensor 112 and/or encoder 118, detect a video event, and instruct another camera to modify video capture operations prior to an object of interest entering the field of view of that other camera. In some configurations, the settings and reference data used by video analysis subsystem 124 may be modified responsive to a video capture update message received by camera 110.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (POE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives. In some embodiments, network video recorder 130 may include internal storage device 140.1 and expandable storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage device 140.*n* may be of the same storage device type or a different storage device type.

In some embodiments, a respective data storage device 140 may include a single non-volatile storage medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.*n*. In some embodiments, storage interface 142 may include a wireless data connection with sufficient bandwidth for video data transfer. Depending on the configuration and protocols used by storage interface 142, storage device 140.*n* may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager 190 configured to provide a user interface for selecting, training, and managing event detection algorithms for surveillance system 100.

Figure 2:
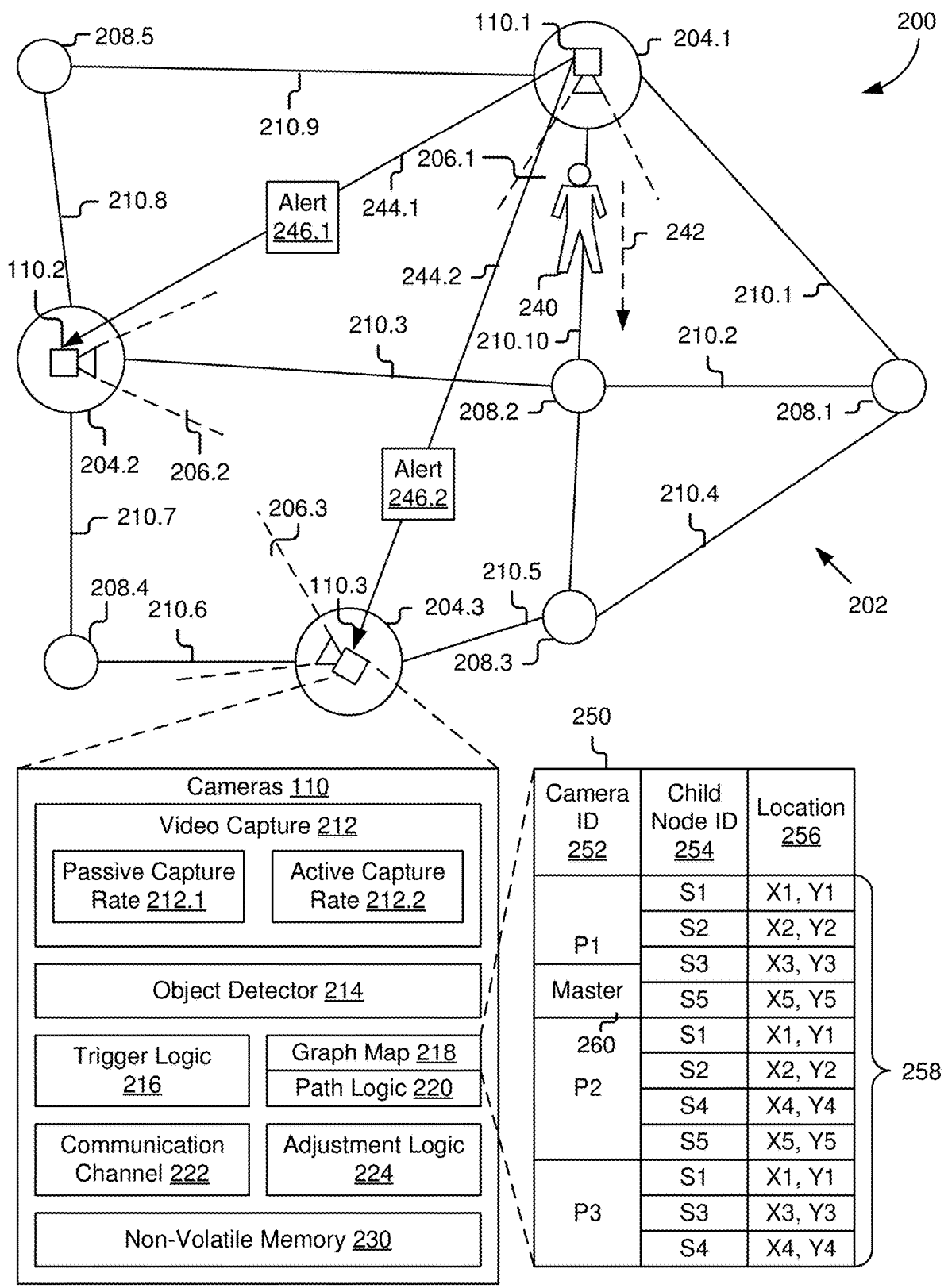
FIG. 2 schematically illustrates an example graph map and camera configuration for multiple networked video cameras configured for using predictive adjustment to modify video capture operations, such as may be used by the computer-based surveillance system of FIG. 1.

FIG. 2 shows schematic representations of multiple networked video cameras configured for using predictive adjustment to modify video capture operations, implemented in a computer-based surveillance system 200, such as surveillance system 100 in FIG. 1. In the example configurations shown, cameras 110 are configured for onboard capture and analysis of video data, but similar functions may be implemented through a host, such as network video recorder 130 described above. In camera environment 202, the three networked video cameras 110.1-110.3 are located around plurality of locations with interconnected paths, such as a network of roads and/or walking paths in city, campus, park, or similar location. In one example configuration, each camera 110 may be placed on the exterior of a building or mounted to a municipal service pole or similar structure to provide video capture in the vicinity of the building, intersection, or other point of interest. Upon installation, cameras 110 have known locations with known spatial relationships to one another and defined fields of view 206. For example, a generally overhead view of camera environment 202 may allow cameras 110 and other relevant attributes of camera environment 202 to be graph mapped using a coordinate position system. Coordinate position systems may include two-dimensional mapping based on longitude and latitude or another X-Y coordinate system and scale applied to camera environment 202. In some configurations, a three-dimensional mapping may be used, such as adding elevation, altitude, or a similar Z coordinate to the two-dimensional coordinate position system. Fields of view 206 may be defined in terms of two or more bounding vectors and may include default position and maximum ranges in each direction of adjustment if equipped with PTZ actuators.

As shown in FIG. 2, a graph map (using a two-dimensional coordinate position system in the example shown) may be overlaid on camera environment 202. Each camera 110 may be treated as a parent node 204. For example, the coordinate position of video camera 110.1 may be abstracted as parent node 204.1, the coordinate position of video camera 110.2 may be abstracted as parent node 204.2, and the coordinate position of video camera 110.3 may be abstracted as parent node 204.3. Paths of travel between or among cameras 110 may be mapped and intersections may be abstracted as child nodes 208 (or sub-nodes). Each child node 208 may be a child node of each parent node that it connects to without going through another parent node or requiring a turn at an intersection (child nodes are connected to parent nodes by straight paths that may pass through another child node, such as node 208.3 being a child node of parent node 204.1 bot not parent node 204.2). For example, child nodes 208.1, 208.2, 208.3, and 208.5 may be child nodes of camera 110.1, child nodes 208.1, 208.2, 208.4, and 208.5 may be child nodes of camera 110.2, and child nodes 208.1, 208.3, and 208.4 may be child nodes of camera 110.3. Each path segment between nodes represents an edge in the graph map. For example, edge 210.1 extends from parent node 204.1 to child node 208.1, edge 210.2 extends from child node 208.1 to child node 208.2, and so on for edges 210.3, 210.4, 210.5, 210.6, 210.7, 210.8, 210.9, and 210.10. Possible object paths may be comprised of each set of edges from one parent node to another parent node, generally through one or more child nodes. In some configurations, the presence of one or more child nodes between each pair of parent nodes may indicate that the cameras do not have overlapping fields of view and may not be capable of simultaneously capturing the same object of interest.

Cameras 110 may be deployed to monitor their respective fields of view 206 for object detection and related object detection event handling, such as alerts, selective archival storage, etc. For example, cameras 110 may be placed in their respective surveillance locations to detect object of interest 240 (in this case, a person) when it moves into their respective fields of view 206 along path of movement 242. Other example objects of interest may include vehicles, animals, equipment, etc. Path of movement 242 may indicate an event direction from the camera that has most recently captured the object of interest (e.g., camera 110.1). However, the presence of intersections and decision points modeled by child nodes 208 may reflect that object of interest 240 may not travel in a straight path toward another camera, and yet may ultimately enter field of view 206 for other cameras based on available object paths. For example, object of interest 240 may enter field of view 206.2 of camera 110.2 by traveling to child node 208.2 and turning right to follow edge 210.3. Alternatively, object of interest 240 may continue straight at child node 208.2 and turn right at child node 208.3 to follow edge 210.5 toward camera 110.3. However, unless camera 110.3 proactively changes its actuator position and field of view 206.3, it is unlikely to capture object of interest 240.

In some configurations, cameras 110 may be configured for video capture 212 based on different video capture rates. For example, cameras 110 may include a passive video capture rate 212.1 that includes lower quality video (e.g., lower pixel count and/or frame rate) to save storage space and/or network bandwidth for operating periods when no objects of interest are likely to be present in the field of view. Cameras 110 may include an active video capture rate 212.2 that includes higher quality video (e.g., higher pixel count and/or frame rate) to provide better video data for analysis, display, and/or storage of possible object detection events. So, even if camera 110.2 is already oriented toward the most likely object travel path, it may be advantageous to proactively and predictively trigger a change in video capture 212.

Once camera 110.1 has detected object of interest 240, it may be advantageous to predictively and selectively adjust the video capture operations of the other cameras. While it may be possible to alert all cameras to modify their video capture operations, doing so every time any of the cameras detected an object of interest would result in a waste of storage, network bandwidth, and other resources. In some configurations, competition for constrained resources in the system, such as limited network bandwidth and/or storage channels, may prevent all cameras from operating at active capture rate 212.2 at the same time and/or for extended periods. Therefore, prediction of which cameras are most likely to have the object enter its field of view may be desirable and to allow those cameras to modify their video capture operations to maximize the likelihood of capturing the object without wasting resources. If camera 110.3 modifies its video capture operations, such as by switching to its active capture rate, pivoting to its right facing actuator position, prioritizing the object detector for the object type of the object of interest, and other changes of video capture operating parameters, before object of interest 240 enters field of view 206.3, it may maximize the chances of capturing high-quality images of the object to support further detection, recognition, monitoring, or other analysis.

Cameras 110 may have been deployed with object detectors 214 configured to detect objects of interest using video data captured at their passive capture rate 212.1 and/or active capture rate 212.2. For example, object detectors 214 may be trained on low-quality video to detect one or more objects of interest at a relatively low confidence threshold to trigger active capture rate 212.2 and processing of additional video data at the higher quality and with an object detector trained on higher quality data to confirm object detection, enable classification and/or object recognition, or support other analysis. Alternately, other sensors, such as motion sensors, audio sensors, etc. or detection algorithms, such as video tripwires, etc., may be used to initially trigger active capture rate 212.2 for a camera when an object of interest initially enters camera environment 202. In some configurations, additional processing of the high-quality video data may include classification of the object type and/or determination of a direction of travel for the object of interest.

Cameras 110 may include trigger logic 216 for determining a video event that triggers predictive adjustment of other video cameras. For example, trigger logic 216 may be based on one or more parameters of the detected object and/or subsequent processing. In some configurations, objects of specific types, such as people, vehicles, or animals, may be a trigger condition and a direction of motion that will take the object out of the current camera's field of view may be another trigger condition. If the trigger conditions are met, trigger logic 216 may access graph map 218 and path logic 220 to determine which other camera or cameras should be modified and, in some configurations, what those modifications should be. For example, graph map 218 may be represented as a reference table or data structure 250 and may include entries 258 for each other video camera identifier 252, child node identifiers 254, and/or child node locations 256, such as coordinates for the coordinate positioning system. In some configurations, near edge entries or fields for each child node identifier 254 and/or location 256 may indicate a start of an object path that may be used to determine, from the event direction and using path logic 220, shared child nodes for reaching one or more other cameras. For example, if a current field of view, such as field of view 206.1, and the position and/or movement of object of interest 240 indicate detected near edge 210.10 for object of interest 240, camera 110.1 may determine shared child nodes 208.2, 208.1, and 208.3 in graph map 218 for cameras 110.2 and 110.3 from reference table 250. Path logic 220 may include a set of logical rules for determining predicted object paths based on graph map 218 and/or reference table 250. In some configurations, camera 110.1 may select cameras 110.2 and 110.3 to receive alert messages or similar video capture update messages based on shared child node identifiers in the event direction.

Cameras 110 may include a communication channel 222 for sending one or more messages, such as a message to update video capture parameters to prepare for an incoming object, to other cameras. For example, cameras 110 may use a camera identifier 252 determined from reference table 250 for the most likely camera(s) to next see the object and include a messaging protocol to address a video capture update message to that camera identifier. In some configurations, cameras 110 may be internet protocol (IP) cameras on a common network and communication channel 222 may be configured for peer-to-peer communications through a network interface. In some configurations, cameras 110 may include a network or direct connection to a host and communication channel 222 may be configured to only communicate with the host. In such configurations, the host may be configured as a router for communications among cameras and/or be configured to process the message from the detecting camera and generate a corresponding video capture update message to send to the predicted camera(s).

In some configurations, one camera in the camera group may be configured as a master camera and messages may be routed to the master camera by the other cameras and the master camera may be configured for network communication with the host and/or master cameras in other video camera groups. For example, camera 110.1 may be configured as master video camera for the camera group including cameras 110.1-110.3. In some configurations, graph map data structure 250 may include a master indicator 260 associated with the camera designated as master camera. For example, graph map data structure 250 may include a master flag appended to camera identifier 252 for the camera designated as master. In some configurations, each camera in the group may send any alert messages to the master camera, in addition to the cameras selected for changing video capture operations and the master camera may evaluate event parameters in the alert message to determine whether other camera groups should be notified of a regional video alert event. For example, the master camera may execute logic or interface with the host to evaluate event parameters and selectively send regional alert messages, such as a regional video capture update message, to other video camera groups via their respective master video cameras.

Cameras 110 may include adjustment logic 224 configured to receive video capture update messages and adjust video capture operating parameters based on such messages. For example, adjustment logic 224 may receive and parse the message from the detecting camera to determine the shared child node identifier and be able to determine the changes in video capture operating parameters corresponding to an object approaching from the shared child node. In some configurations, a set of video capture operating parameters based on the object type, predicted direction of entry into the field of view, and/or other parameters to assist in modifying the video capture of the predicted camera may be determined based on the received message and shared child node identifier. In some configurations, reference table 250 may be configured with sets of operating parameters indexed by object type, child node identifier, and the applicable set of operating parameters may be included in the message or the object parameters in the message may allow the receiving camera to determine the set of operating parameters from the table. Adjustment logic 224 may use the modified parameters to initiate changes in the operation of camera actuators, encoders, analysis, and/or storage functions in response to the message. In some configurations, adjustment logic 224 in the receiving camera may also be configured to recognize when that camera is already engaged in high-priority video capture (such as due to a different object of interest or event) and may reject predictive updates that would negatively impact the current video capture operations.

Cameras 110 may include non-volatile memory 230 configured to store video data captured by that video camera. As described above, on-camera memory may include a limited capacity and cameras 110 may send video data through communication channel 222 to be stored in other memory systems, which may include the memory of other cameras, a host, and/or video storage accessible through the host. In some configurations, modification of video capture operating parameters may include increasing the quality of captured video (in terms of both sample rate and encoding) and a commensurate increase in the amount of storage capacity used to store such video.

Figure 3:
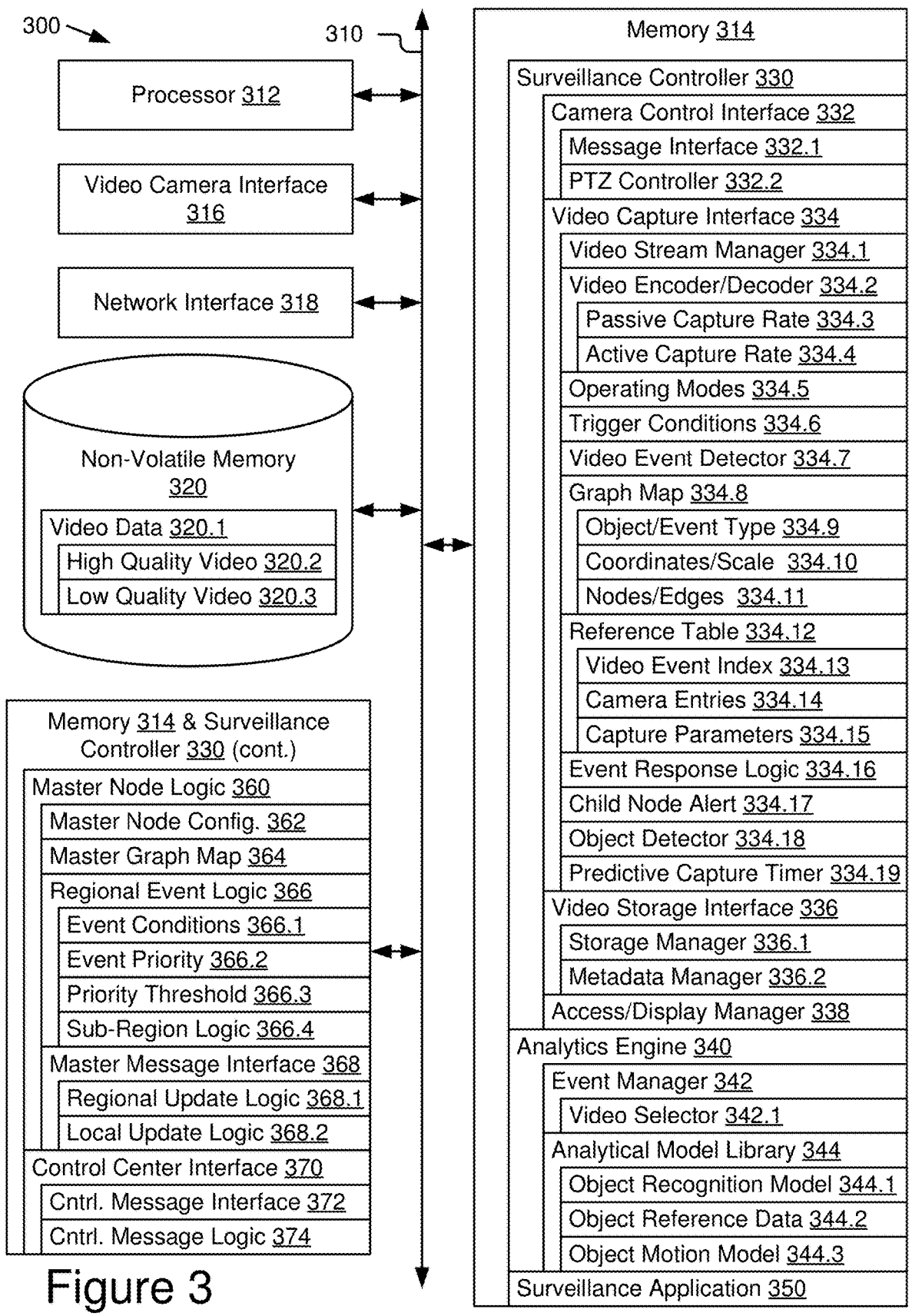
FIG. 3 schematically illustrates some elements of the computer-based surveillance system of FIG. 1.

FIG. 3 schematically shows selected modules of a surveillance system 300 configured for predictively modifying the video capture operations of selected cameras based on a graph map, as well as a configuration for a master video camera to coordinate alerts across camera groups. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of surveillance controller 330 and/or those functions may be shared between the video camera controller and a network video recorder or video surveillance as a service (VSaaS) server. Similarly, some or all of analytics engine 340 may instantiated in the video camera and/or shared with other surveillance system components.

Surveillance system 300 and/or any component thereof may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by video cameras and/or a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control one or more video cameras, capture and store video streams from those cameras, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350.

In some embodiments, some or all functions of surveillance controller 330 may be onboard each video camera and no network video recorder may be required. For example, a group of networked video cameras may be configured to use onboard memory and processors for camera control and video capture, including generation and response to alerts or notifications to update video capture operations, and may include some amount of onboard video storage. In such configurations, the group of networked video cameras may be configured to interface with a remote surveillance manager and/or surveillance application operating on control center or end user computer systems, which may include the functions of a network video recorder, network video server, and/or network video storage.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338. In some configurations, surveillance controller 330 may include an alternative configuration for master video cameras that includes master node logic 360 and/or control center interface 370.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include a message interface 332.1 for sending and/or receiving control messages with one or more cameras. For example, message interface 332.1 may include a messaging protocol for adjusting operating parameter values for each camera. In some configurations, camera-specific configuration parameters may include a range of operating values and corresponding conditions for using those operating parameters for video capture operations. For example, different sets of configuration parameters may be used for different times, environmental conditions, or operating modes for each camera. Message interface 332.1 may enable surveillance controller 330 to modify the current operating configuration parameters of a camera. For example, message interface 332.1 may be configured to send a video capture update message to change one or more video capture parameters for a selected video camera. In some configurations, message interface 332.1 may use internet protocol, master-slave, and/or multi-master messaging over video camera interface 316 and/or network interface 318 to send messages to selected cameras. In some configurations, application-level messaging may be used to send, parse, and respond to messages and enable the cameras to determine parameter changes from the message content to initiate changes in video capture operations. In some configurations, message interface 332.1 may enable surveillance controller 330 to directly change memory locations in the cameras that store the configuration parameters to be changed using one or more update messages. In some configurations, message interface 332.1 may be integrated in or responsive to video capture interface 334 to enable surveillance controller 330 to respond to video events by sending video capture update messages to selected cameras. In some configurations, message interface 332.1 may include a peer-to-peer message interface among video cameras in a networked group to enable direct communication among the video cameras for alerts and video capture update messages.

In some embodiments, camera control interface 332 may include a PTZ controller 332.2 for one or more video cameras. For example, each video camera may be equipped with a PTZ control unit and associated motor and/or digital controllers and command interface for moving that video camera from its current position to pan, zoom, and/or tilt to change the field of view. In some embodiments, PTZ controller 332.2 may include a remote controller unit that sends PTZ control commands to adjust camera position and/or zoom in real-time, such as responsive to the detection of an object of interest in the field of view (but not ideally positioned in the field of view). In some embodiments, PTZ controller 332.2 may include a set of configuration settings for auto-tracking or auto-capture functions within the selected video camera. For example, one or more cameras may include an auto-capture feature for detecting objects of interest and then centering and zooming on the detected object. PTZ controller 332.2 may be used to configure the parameters of the auto-capture feature, such as classes of objects (e.g., humans, human faces, vehicles, license plates, etc.) to be captured, PTZ ranges or limits, timing, quality or reliability thresholds, etc. In some embodiments, PTZ controller 332.2 may be configured for responding to an update message (from message interface 332.1) regarding video events that are outside the current field of view of the camera in order to predictively change video capture operating parameters in anticipation of an object entering the field of view. For example, responsive to a video event for an object approaching from the direction of another camera, PTZ controller 332.2 may be commanded to pan the camera toward the other camera or an anticipated intercept point of an object of interest in the adjusted field of view.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, each video camera configured as a primary video camera may have a dedicated video channel for their respective primary video streams. Video capture interface 334 may be configured to pass each received video stream to video storage interface 336, analytics engine 340, and/or access/display manager 338. For example, received video streams may be buffered by video capture interface before being streamed to video storage interface 336, analytics engine 340, and access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components. In some embodiments, video capture interface 334 may support an audio channel or audio track for audio data synchronized to the captured video data. For example, one or more video formats supported may include one or more audio channels for audio data from one or more microphones associated with the video camera. In some embodiments, video capture interface 334 may use video events detected from one camera to trigger changes in video capture operations, such as video capture operating modes and video capture rates, of one or more other video cameras in surveillance system 300.

In some embodiments, video capture interface 334 may include a video stream manager 334.1 configured to identify and manage the plurality of video streams being received from the cameras. For example, video stream manager 334.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths. For example, the storage path (through video storage interface 336), the display path (through access/display manager 338), and/or the analytics path (through analytics engine 340) may each be configured for specific processing, priority, and timing. In some embodiments, one or more selectable storage paths and corresponding storage locations or storage modes may be associated with different video capture operating modes and/or video capture rates and may be selected in response to triggers, such as video event triggers.

In some embodiments, video stream manager 334.1 may be configured to use encoder/decoder 334.2 to encode camera video streams in a desired video format. In some embodiments, encoder/decoder 334.2 may be configured to receive the raw video data stream from the image sensor and determine the video data format to be used, including a capture rate of the raw data from the image sensor. For example, the video capture rate may include a number of pixels or resolution of the image data from the image sensor and a frame rate determining how frequently the pixel values are determined. In some embodiments, encoder/decoder 334.2 may support two or more selectable video capture rates and corresponding video formats. For example, encoder/decoder 334.2 may support a passive video capture rate 334.3 and an active video capture rate 334.4. Passive video capture rate 334.3 may have a lower rate than active video capture rate 334.4 such that passive video capture rate 334.3 captures less video data (e.g., low quality video 320.3) and requires less processing, network bandwidth, and/or data storage, but with lower video quality that may be less effective for display and/or analytics. Active video capture rate 334.4 may capture more video data with higher video quality (e.g., high quality video 320.3) for display and analytics, but at the cost of increased processor use, network bandwidth, and/or data storage. In some embodiments, video encoder/decoder 334.2 may support more than two selectable video capture rates. In some embodiments, in-camera video encoders may encode video data from the image sensor in a first (camera) video format and video stream manager 334.1 may use encoder/decoder 334.2 to re-encode them in one or more other formats. For example, video stream manager 334.1 may use encoder/decoder 334.2 to change the resolution, image size, frame rate, codec, compression factor, color/gray-scale, or other video format parameters.

In some embodiments, video capture interface 334 may include a plurality of operating modes 334.5. For example, a standby operating mode may include a low power state in which the video camera is not actively capturing video and a normal operating mode may include a normal power state where the video camera may activate any of its resources, including capturing video using its image sensor and processor. In some embodiments, operating modes 334.5 may include low light operating modes for low light conditions, motion/tripwire-only modes where only low-level processing of image sensor data (or a separate motion sensor) is active without video capture, and other operating modes. In some embodiments, one or more operating modes may be associated with specific video capture rates and encoding formats. For example, a passive video capture mode may use passive video capture rate 334.3 and an active video capture mode may use active video capture rate 334.4. Video cameras may use different operating modes during different operating periods and operating modes may be used to modify one or more video capture operations. For example, each operating mode may define whether or not video capture is suspended or operating and, if operating, what set of video capture parameters are being used, such as video capture rate (resolution and frame rate), encoding codec, filters, etc.

In some embodiments, video capture interface 334 may include trigger conditions 334.6 for moving between operating modes 334.5. For example, video capture interface 334 may have a default operating mode and one or more other operating modes that are triggered when specific conditions are met. For example, a camera may be configured to default to normal operating mode but change to low-light operating mode when light levels drop below a threshold. In some configurations, a camera may include passive video capture mode as a default mode for continuous video surveillance, due to the lower resource usage, and include one or more triggers conditions 334.6 for changing the operating mode. For example, when motion, a video tripwire, or an object are detected from the passive video data, the video capture interface 334 may change the operating mode to the active video capture mode for the camera that detected the condition. However, these video-based triggers may be less reliable using passive video data and there may be a lag between an object entering the field of view and successfully triggering a video condition, including the required processing time for the monitoring analytics. In some embodiments, video capture interface 334 may include one or more trigger conditions 334.6 based on predictively changing operating modes based on video events occurring at other video cameras. For example, video capture interface 334 may include a video event detector 334.7 that determines video events from each camera and uses graph map 334.8 and/or reference table 334.12 to determine which other cameras should change operating modes and what those operating mode changes should be.

Video event detector 334.7 may support detection of one or more video event types based on the video data received by surveillance controller 330. For example, incoming video streams for each camera may be processed through one or more analytical models, such as object detector 334.18, to determine whether an object of interest appears within a frame of video data at a selected confidence threshold. In some configurations, video event detector 334.7 may use video event parameters generated from one or more sources, such as video metadata, time, camera-detected events (e.g., motion sensors, video tripwires, low-weight on-board object detectors, etc.), and output from one or more analytics engines. For example, an object may be detected by a camera's onboard object detector and, based on the type of object detector, assigned an object type parameter, as well as detection time, and location in frame. In some configurations, an actuator position (and corresponding field of view) may be mapped to an edge in graph map 334.8 to determine an event direction. For example, the actuator position may define a set of vectors defining the field of view and an object position in the field of view may correspond to a path represented by an edge in graph map 334.8 that may be referred to as an event detected edge. In some configurations, an analytics engine with an object motion tracking model may then process a series of video frames in the video data stream to determine a direction of travel of the detected object. The object detection may trigger video event detector 334.7 to identify a video event and initiate event response logic 334.17 to evaluate graph map 334.8 and/or reference table 334.12 to determine whether video capture parameters of one or more other cameras should be updated. In some configurations, video event detector 334.7 may isolate video frames or a portion of the video data (e.g., bounding box) corresponding to an object of interest to include among the video event parameters, along with other object data.

Graph map 334.8 may include a data structure for representing the surveillance environment and video cameras as a set of nodes and edges, such as described above with regard to FIG. 2. For example, graph map 334.8 may include a set of parent nodes corresponding to the video cameras in the surveillance system and a set of child nodes mapped to object travel paths among the video cameras and, more specifically, the intersections of those paths. In some configurations, graph map 334.8 may include a plurality of graph maps configured for different object and/or event types 334.9. For example, one graph map may be configured for pedestrian traffic and model the walking paths among the locations where the cameras are located and another graph map may be configured for vehicular traffic and model the driving paths among the locations. Similarly, different graph maps may be configured for different times of day or conditions. For example, some paths may be closed during certain times of day and this may be reflected in different sets of child nodes and edges.

Graph map 334.8 may be based on a coordinate position system comprised of a coordinate grid and scale 334.10. For example, latitude and longitude coordinates may be used as the coordinate grid. Alternatively, another grid system may be laid out for a campus, building complex, city, or other area of interest based on relevant features to define an alternate coordinate grid. Coordinate position systems may include two-dimensional coordinate layouts, such as longitude and latitude or another X-Y coordinate system. Different camera groups may use different coordinate position systems, which may be based on the scale, configuration of the sub-region, and/or size/precision of target objects of interest. In some configurations, a three-dimensional coordinate layout may be used, such as adding elevation, altitude, or a similar Z coordinate to the two-dimensional coordinate position system. Based on the coordinate position system each camera and interconnecting paths may be modeled in graph map 334.8 as nodes and edges 334.11. Using the coordinate position system, each camera may be defined as a parent node with a specific coordinate position (e.g., X-Y values) and each intersection may be defined as a child node with its own coordinate position. Edges may be defined as lines interconnecting the parent nodes and child nodes. In some configurations, graph map 334.8 may be represented as a data structure, such as a data table or array, comprised of coordinates for each node and pairs of nodes defining edges. In some configurations, edge data may enable calculation of corresponding path lengths for each edge and the path lengths for multiple edges traversed for a path between and across nodes may be determined from aggregating those path lengths.

Reference table 334.12 may include a data structure for using video event parameters to determine which other cameras would benefit from a change in operating mode to improve the likelihood of capturing additional video data relevant to the triggering video event. For example, where an object of interest is detected by one camera, reference table 334.12 may include entries for each other camera that indicates their spatial relationship to the detecting camera based on graph map 334.8. In some configurations, reference table 334.12 may include a video event index 334.13 comprising one or more index fields corresponding to relevant event parameters. For example, video event index 334.13 may include a combination of type of object and event direction parameters for a detected object of interest. An event detected edge determined from camera and object positions and graph map 334.8 may be used as an index value for video event index 334.13. In some configurations, each camera entry 334.14 in reference table 334.12 may include a camera identifier and location parameters that define the field of view, parent node coordinates, and child nodes for that camera. For example, the same camera identifier used for managing camera configuration parameters may be used and the location parameters may include parent node coordinates, child node coordinates, and possible object detection edges based on the actuator/field of view ranges of that camera. In some configurations, each entry may also include a set of video capture parameters 334.15 that correspond to an increased likelihood of capturing a subsequent video event in the field of view of that camera. For example, video capture parameters 334.15 for a spatially adjacent camera may include active capture rate parameters and PTZ control parameters for moving the camera to the nearest position for its field of view and a predicted edge to a shared child node. In some configurations, reference table 334.12 may include multiple entries for each camera relative to each other camera and indexed by event direction and/or detected event edge parameters to determine whether and which other cameras identifiers and sets of video capture parameters are selected in response to any given video event (based on shared child nodes in the event direction).

In some embodiments, event response logic 334.16 may include logical rules for applying video events and their corresponding video event parameters to trigger conditions 334.6 for triggering one or more operating modes 334.5. For example, video response logic 334.16 may include a set of threshold values and logical rules for applying those threshold values to triggering modification of the video capture operations. In some configurations, video response logic 334.16 may include a set of active capture thresholds for initiating active video capture rate 334.3 and/or a corresponding active video capture mode. In some configurations, event response logic 334.16 may use graph map 334.8 and/or reference table 334.12 for determine whether and what cameras should have their video capture parameters changed. For example, video event detector 334.7 may use video event parameters to search video event index 334.13 to determine whether the video event should trigger operating mode changes for any of the other video cameras. If no video event index values match the corresponding video event parameters, then no update messages may be initiated. Similarly, if multiple entries are returned in the search for different cameras, then update messages may be sent to multiple cameras. In some configurations, event response logic 334.16 may use graph map 334.8 and/or reference table 334.12 to determine a set of child nodes relative to the detecting camera that are shared with other cameras. The set of shared child nodes may be filtered based on the event direction and/or object detected edge to include only the shared child nodes in that direction. Event response logic 334.16 may generate a video capture update message to send to the cameras with shared child nodes based on the identified child node. For example, message interface 332.1 may be used to send a child node alert 334.17 that includes a child node identifier for the shared child node and that shared child node identifier may be used by the receiving camera to determine the video capture parameter changes to be made, such as adjusting the camera position toward the shared child node.

In some configurations, threshold values used by event response logic 334.16 may include confidence thresholds for the object detection or classification and/or direction of motion. For example, video event detector 334.7 may return a video event with an object type, type confidence value, direction of motion value, and motion confidence value. If the object type matches an object of interest type, the type confidence value meets a type confidence threshold (e.g., 50%), and the direction of motion value meets the motion confidence threshold (e.g., 50%), then video response logic 334.16 may trigger message interface 332.1 to send a video capture update message to the selected camera or cameras. In some embodiments, additional and/or alternative logical rule sets and/or entries in reference table 334.12 for applying video event parameters to initializing video capture, triggering PTZ movement toward a predicted intercept location with the camera field of view, and/or changing data storage and/or processing paths may be included in event response logic 334.16.

In some embodiments, video capture interface 334 may be configured with an object detector 334.18 supporting detection of one or more object classes, such as people, animals, motor vehicles, etc. For example, object detector 334.18 may operate on captured video data received from a video camera to detect whether an object of interest is present in the video data. In some embodiments, object detector 334.18 may include a lightweight object detection model that can be processed in near real-time with the limited processing bandwidth of the video camera and/or associated compute resources. In some embodiments, the object detection model may operate on the video data in the video stream and return a flag or class for the object type detected, an object quality of confidence metric, object position, and/or object boundary data, such as two horizontal positions and two vertical positions to define a boundary box within the video frame. In some embodiments, object detector 334.18 may have one or more associated object confidence thresholds for evaluating the object confidence value for each object detection event. For example, object detector 334.18 may include an object detection threshold, below which the presence of an object is not treated as sufficiently certain to raise an object detection event, such as 50% reliability. In some embodiments, object detector 334.18 may be used to identify object detection events and raise corresponding alerts to video event detector 334.16.

In some embodiments, video capture interface 334 may include a predictive capture timer 334.19 configured to determine how long a camera that predictively changes its video capture operations should wait to see whether the object of interest is detected or return to default operation. For example, predictive capture timer 334.19 may use a predefined operating period after the sending of the update message and/or change of parameters by the selected camera to determine a duration to wait for the object of interest to be detectable within its field of view. In some configurations, the duration for the predictive operating period may be a default value, predetermined for each spatial relationship (e.g., provided in the corresponding entry in reference table 334.12), and/or dynamically generated based on the distance between cameras and a velocity from the object motion model. In some configurations, an object path length may be calculated from the edges traversed between the two camera parent nodes, where each edge between nodes traversed for the path are added together to determine the path length. If multiple shared child nodes and/or paths exist between the parent nodes, then multiple path lengths may be determined and used, such as by averaging or using the maximum or minimum path length. Once the duration for the predictive operating period is determined for a particular video event and camera, predictive capture timer 334.19 may monitor the elapsed time and return the camera to its default operating mode when the duration is met. For example, when the time has elapsed, message interface 332.1 may send another update message to return the camera to default operation. Alternatively, the parameters sent in the original update message may include a duration parameter and the camera may execute its own predictive capture timer to automatically return to default operation when the time has elapsed.

Video storage interface 336 may include storage interface protocols and a set of functions, parameters, and data structures for managing storage of video data 320.1 in non-volatile memory 320, such as storage devices and/or network video storage, for later retrieval and use by access/display manager 338 and/or analytics engine 340. For example, video storage interface 336 may write camera video stream data from video data buffers and/or storage path video data from video capture interface 334 to non-volatile memory 320. In some embodiments, audio data may be stored in separate audio data files or objects and/or as synchronized audio data in audio tracks or channels of video data 320.1. In some embodiments, video storage interface 336 may include a storage manager 336.1 configured to manage video storage space in non-volatile memory 320 in accordance with one or more operating modes 334.5, data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 336.1 may support different storage locations for high quality video 320.2 captured during active video capture modes and low quality video 320.3 captured during passive video capture modes. Video storage interface 336 may also include a metadata manager 336.2 to receive and store video metadata as tags or metadata tracks in the video data or in an associated metadata table, file, or similar data structure associated with the corresponding video data objects.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected audio and video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 338 may provide selective access to user video format 336.2 and/or video streams allocated by video capture interface 334 to the user video path.

Analytics engine 340 may include interface protocols, functions, parameters, and data structures for analyzing video data to detect video events, add them to video metadata, and/or raise alerts, such as through surveillance application 350. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with analytics capabilities, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342 and analytical model library 344. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types and updating or adding metadata parameters describing the detected video events. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include, support, or supplement event detection by surveillance controller 330, such as video events from video event detector 334.7 and/or object detection events from object detector 334.18. In some embodiments, event manager 342 may include a video selector 342.1 configured to select target video streams or video data sets for analysis, including associated audio data. For example, video selector 342.1 may identify a real-time video stream for near real time analysis or a bounded video data set, such as video with a specified camera identifier and timestamps between beginning and ending time markers and/or including a defined set of metadata parameters. Event manager 342 may include an event type selector configured to determine one or more event types to be detected from the selected video data. For example, an analytics configuration may be configured to analyze the selected video stream for a predefined set of audio event detection, motion detection, tripwire detection, object recognition, facial recognition, speech recognition, and/or similar video event types. Each event type may map or correspond to an analytical model type, set of parameters, and one or model weights for defining an event detection algorithm stored in analytical model library 344 for use by analytics engine 340 to detect potential video events (and/or predictive audio events).

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target object classes (e.g., cars, license plates, equipment, people, etc.), and/or training conditions. In some embodiments, analytical model library 344 may also support audio analytical models and/or combined video with audio analytical models. Each analytical model may include a set of base equation(s) for the analytical model type, set of target parameters, and one or model weights that determine the event detection algorithm that will be used for the event detection processing. In some embodiments, at least some analytical models may be machine learning based models trained based on one or more sets of relevant reference data. For example, the base equations may be trained using the reference data sets to determine the model weights to be used in the resulting analytical model. Trained analytical models may be deployed in analytics engine 340 and/or surveillance controller 330. In some embodiments, analytics engine 340 may include or access training services for generating (training) or updating (retraining) analytical models in analytical model library 344.

In some embodiments, analytical model library 344 may include at least one object recognition model 344.1. For example, a motor vehicle recognition model may apply a set of weighted parameter values representing the relationships among sets of feature vectors for comparison with reference data (such as sets of feature vectors for known motor vehicles) and determination of a probabilistic reliability or correlation factor. Analytical model library 344 may include or access object reference data 344.2 for matching detected objects with previously identified (or recognized) reference objects. For example, the motor vehicle recognition model may be applied to a reference database of relevant motor vehicle images and/or feature sets extracted therefrom to provide vehicle reference data. In some embodiments, for any given detected object, object recognition model 344.1 may return one or more recognized matches and a corresponding reliability value. For example, the motor vehicle recognition model may return one or more known individuals from the reference data and corresponding reliability values, assuming at least one match is found that meets a threshold reliability value. In some configurations, the video event parameters for an initial object detection event may be used as reference data for matching a similar object detected on other video data from cameras. For example, once an object of interest is detected, the bounding box and image data it contains may be designated as reference data for subsequent object recognition calculations of other cameras detecting an object of the same type in response to receiving an update message.

In some embodiments, analytical model library 344 may include at least one object motion model 344.3 for tracking and predicting movement of an object of interest based on video data. For example, object motion model 344.3 may include an object motion tracking model that detects the same object frame-to-frame. In some configurations, object motion model 344.3 may leverage the bounding boxes for an object from frame-to-frame to track the motion of that object through the video frame. The motion of the detected object in the frame may then be translated by a spatial model into a likely direction of travel for the object itself. For example, for a particular camera position, movement to the right in frame may roughly correlate to northward movement in the surveillance environment and left movement may correlate to southward movement. Changes in size of the object may also be used to estimate movement into or out of the frame. In some configurations, object motion model 344.3 may be used to determine a direction of movement parameter for video event detector 334.7. Other models for determining or approximating direction of travel of an object of interest within video data may also be employed.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some configurations, surveillance controller 330 may include additional functions for a selected camera in a camera group to act as a master camera or master node for that group of networked video cameras. For example, the instance of surveillance controller 330 in the master video camera may include master node logic 360. Master node logic 360 may include APIs and a set of functions, parameters, and data structures for determining regional events from the local event alerts generated by the cameras in its group and handling notifications to and from other networked camera groups in the same region. In some configurations, master node logic 360 may include master node configuration parameters 262. For example, master node configuration parameters 262 may include one or more master node indicators for the selected video camera. In some configurations, the master node indicator may be included as a reference value in one or more graph maps or related data structures. For example, the master node indicator may be a flag value appended to the parent node or camera identifier in graph map 334.8 and/or reference table 334.12 that indicates to any system (other cameras, surveillance management system, etc.) that the corresponding video camera is the master camera for that group.

Master node logic 360 may include a master graph map 364 configured to interrelate the sub-region graph maps of each sub-region and corresponding group of networked video cameras. For example, master graph map 364 may include parent nodes corresponding to the master video camera of each group and the connections and spatial relationships of those master video cameras may be represented in master graph map 364. In some configurations, master graph map 364 may include additional node data for describing other camera nodes and/or edges in the sub-region. However, master graph map 364 may be based solely on the relationships among master nodes and only the master video cameras (and their groups) may have access to their sub-region or local graph map for the camera group to reduce cross-group overhead.

Master node logic 360 may include regional event logic 366 configured to determine, based on local video events in their group, when a regional video alert event has occurred and notification should be provided to other master video cameras and their groups. For example, regional event logic 366 may process alerts or messages generated from cameras within their group (including from processing their own video) and received through message interface 332.1 in order to determine whether regional alert or video capture update messages should be sent to one or more other video camera groups. Regional event logic 366 may include a set of event conditions 366.1 that are evaluated for each local group video event. For example, event conditions 366.1 may be configured as logical rules for evaluating one or more video event parameters and/or related criteria or thresholds for determining that a particular video event is regionally significant. Regional event logic 366 may determine an event priority value 366.2 for any regional video event meeting the event conditions. For example, the same set of logical rules for evaluating the video event parameters for event conditions may also determine corresponding priority values, such as for different types of objects, time of day, location, and/or confidence values. Regional event logic 366 may include at least one priority threshold 366.3 selected in the range of possible priority values and determining a priority level at which regional notifications should be sent. For example, a first priority threshold (low) may determine that the event conditions should be classified as a regional video alert event, a second priority threshold (medium) and a third priority threshold (high) may determine which other groups receive the alert and how the receiving master camera and camera groups handle the incoming alert and associated video capture updates. Sub-region logic 366.4 may include rules for determining which other sub-regions should be notified of the regional event. For example, sub-region logic 366.4 may use event priority values 366.2 and priority thresholds 366.3 to determine which master cameras to notify, such as low priority events notifying only the next adjacent (or overlapping) group in the last known direction of the object of interest, medium priority events notifying all adjacent (or overlapping) groups, and high priority events notifying all groups. Sub-region logic 366.4 may use master graph map 364 to evaluate adjacency and range to other sub-regions for selecting video camera groups to alert.

Master node logic 360 may include a master message interface 368 for communication with the master cameras of other camera groups. For example, master message interface 368 may be configured similarly to message interface 332.1, but include the network addresses or similar identifiers or channels for each other master video camera for the other sub-region groups. In some configurations, master message interface 368 may include direct network communication among master video cameras or may use a host, control center, or similar surveillance management system for routing messages among master video cameras. Master message interface 368 may include regional update logic 368.1 configured to generate alert messages for selected master cameras. For example, regional update logic 368.1 may select video event parameters for inclusion in the payload of the alert or notification. These video event parameters, such as a video sample of the triggering video event, object parameters for the detected object of interest, a last known location (e.g., coordinates of the video camera that captured the video event) and/or direction of travel of the object of interest, may be included in a regional video capture update message for use by the receiving camera groups. Event priority, time, and other metadata associated with the event may also be included in the regional video capture update message. Regional update logic 368.1 may assemble the message payload and send the message through master message interface 368 to the master video cameras selected by sub-region logic 366.4. Master message interface 368 may also include local update logic 368.2 configured to receive and parse alert messages received from other master video cameras and corresponding groups. For example, local update logic 368.2 may receive regional video capture update messages and determine how to handle them for their group. Local update logic 368.2 may use event priority and/or other video event parameters to determine whether to distribute a corresponding local video capture update message to one or more cameras in its group. For example, local update logic 368 2 may compare the received event priority with the operating priority of the group and/or individual cameras in the group to determine whether they should be updated. In some configurations, once local update logic 368.2 determines that a received regional video event meets the priority threshold for its group, it may treat the video event as if it had detected it itself (e.g., similar to the output of video event detector 334.7) and use its local graph map 334.8, reference table 334.12, and event response logic 334.16 to notify some or all other cameras in the group with a local video capture update message. For example, the event parameters from the regional video event may be sent to all parent nodes in the graph map and/or selectively based on the video event location, direction of travel, and/or relative locations of the receiving group and the originating group. In some configurations, each video camera may include its own operating priority and may evaluate the local video capture update message priority to determine whether or not to modify that camera's operations. For example, if a camera has recently triggered its own high priority video capture operation, it may ignore video capture update messages with low or medium priority.

In some configurations, surveillance controller 330 may include additional functions for the master camera or master node to communicate with a control center hosting a surveillance management controller. For example, the instance of surveillance controller 330 in the master video camera may include control center interface 370. Control center interface 370 may include APIs and a set of functions, parameters, and data structures for communicating with one or more control centers that oversee operation of the groups of networked video cameras in the region. Control center interface 370 may include a control message interface 372 for sending and receiving messages with the control center system, such as a surveillance management controller. Control message interface 372 may be configured substantially similar to message interface 332.1 to provide messaging between the master video camera and the control center over a network channel. Control center interface 370 may include control message logic 374 for generating messages to send to the control center and handling messages received from the control center. For example, control message logic 347 may include an interface to master node logic 360 for receiving and directing regional video event messages and/or video event data to and from the control center. Configurations using the control center computer systems as an intermediary between camera groups and their corresponding master video cameras is further described with regard to FIG. 4.

Figure 4:
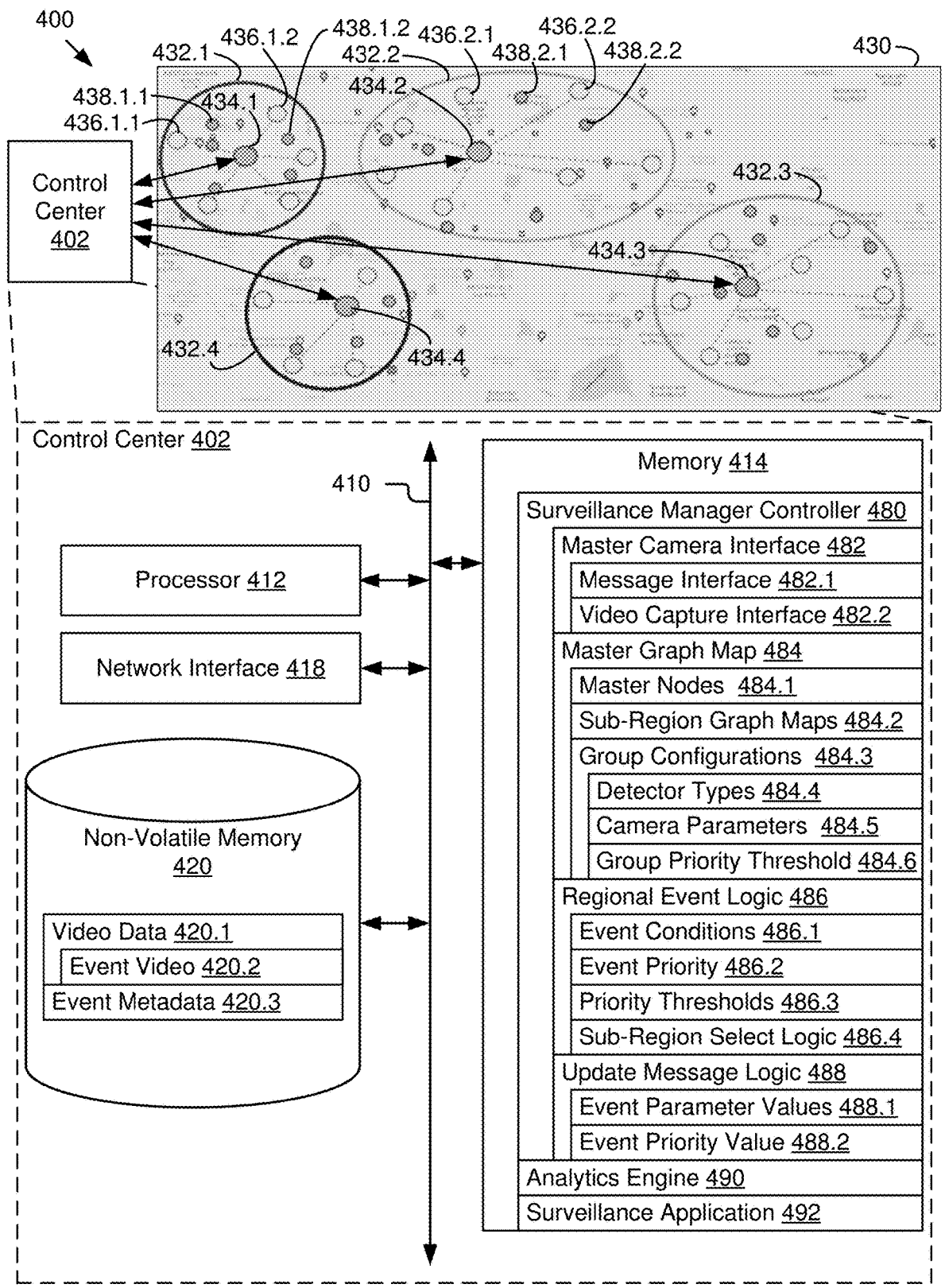
FIG. 4 schematically illustrates a region monitored by multiple groups of networked video cameras and corresponding sub-region graph maps and some elements of a computer-based surveillance management system for use with the computer-based surveillance systems of FIGS. 1-3.

FIG. 4 schematically shows selected modules of a control center computer system 402 configured for monitoring a set of networked video camera groups 400 in a region 430 using sub-region graph maps, as well as a configuration for a master video camera to coordinate alerts across camera groups. Control center computer system 402 may incorporate elements and configurations similar to those shown in FIGS. 1-3. For example, control center computer system 402 may include the functions of a network video recorder similar to network video recorder 130. In the example shown, control center computer system 402 may interface with camera groups 432.1, 432.2, 432.3, and 432.4 in region 430. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of surveillance controller 330 and/or those functions may be shared between the video camera controller and a network video recorder or video surveillance as a service (VSaaS) server.

Region 430 is shown as a map area where multiple camera groups have been deployed in specific physical locations. Each video camera group 432 may include a plurality of networked video cameras as described above. Each video camera group 432 may also be represented in a corresponding sub-region graph map for that group and its associated physical locations (or sub-region). In the example shown, each video camera group 432 includes a master video camera 434 (represented as a master node in the graph map) and a number of other video cameras 436 (represented as parent nodes in the graph map—the master node is also a parent node). For example, group 432.1 includes master video camera 434.1 and other video cameras 436.1.1 and 436.1.2 (among others) and group 432.2 includes master video camera 434.2 and other video cameras 436.2.1 and 436.2.2 (among others). Each video camera group 432 may also include a number of child nodes 438 in their corresponding sub-region graph maps corresponding to turns or connections in the paths among video camera locations. For example, group 432.1 includes child nodes 438.1.1 and 438.1.2 (among others) and group 432.2 includes child nodes 438.2.1 and 438.2.2 (among others). Like symbols in each group 432 correspond to like nodes (e.g., video camera/parent nodes 436 and child nodes 438) and additional labels have been omitted for brevity and to reduce the complexity of the figure. So, for example, group 432.3 includes seven other video cameras 436 in addition to master video camera 434.3 and seven child nodes 438, even though they are not labeled, and group 432.4 includes four other video cameras 436 and four child nodes 438. Each master video camera 434 is communicatively connected, such as via network communication, to control center computer system 402. In some configurations, other video cameras 436 may also be communicatively connected to control center computer system 402.

Control center computer system 402 may include a bus 410 interconnecting at least one processor 412, at least one memory 414, and at least one interface, such as network interface 418. Bus 410 may include one or more conductors that permit communication among the components of control center computer system 402. Processor 412 may include any type of processor or microprocessor that interprets and executes instructions or operations and may include multiple processors operating alone or in combination to execute the operations described herein. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. Non-volatile memory 420 may include one or more data storage devices configured to store video data 420.1, which may include event video data 420.2, and/or event metadata 420.3, such as video event parameters, in corresponding data structures for use by control center computer system 402.

Control center computer system 402 may include a plurality of modules or subsystems that are stored and/or instantiated in memory 414 for execution by processor 412 as instructions or operations. For example, memory 414 may include a surveillance manager controller 480 configured to manage the operation of a set of groups of networked video cameras. Memory 414 may include an analytics engine 490 configured substantially as described above for analytics engine 340. Memory 414 may include a surveillance application 492 configured substantially as described above for surveillance application 350.

Surveillance manager (or management) controller 480 may include interface protocols, functions, parameters, and data structures for connecting to and controlling groups of cameras and may include capturing and storing video data from those cameras. For example, surveillance manager controller 480 may be an embedded firmware application and corresponding hardware in a network video recorder configured for network and/or direct communication with a set of associated video cameras. Surveillance manager controller 480 may be configured as a central collection point for video streams from the associated video cameras that enables analysis of captured video data by analytics engine 490 and presentation of video streams and video event alerts to a user through surveillance application 492. Surveillance manager controller 480 may include a plurality of hardware and/or software modules configured to use processor 412 and memory 414 to handle or manage defined operations of surveillance manager controller 480. For example, surveillance manager controller 480 may include a master camera interface 482, a master graph map 484, regional event logic 486, and update message logic 488.

Master camera interface 482 may be configured substantially similar to camera control interface 332 for establishing communication between control center computer system 402 and the master cameras for each group. Message interface 482.1 may be configured substantially similar to message interface 332.1 and video capture interface 482.2 may be configured substantially similar to video capture interface 332.2.

Master graph map 484 may include a graph map that interrelates the video camera groups monitored by control center computer system 402. For example, master graph map 484 may include master nodes 484.1 corresponding to the master cameras and describing their relative positions to one another. In some configurations, master graph map 484 may be embodied in a data structure with entries corresponding to master nodes 484.1 and coordinate positions on a shared coordinate system, such as longitude and latitude positions. Node connection may be used to represent adjacency and/or overlap among the camera groups corresponding to the master nodes. Master graph map 484 may include sub-region graph maps 484.2 that describe the parent nodes, child nodes, and edges and corresponding physical locations of each camera group as described above for graph map 334.8. For example, master graph map 484 may maintain master copies of the graph maps representing and used by each camera group to coordinate local alerts and video capture update messages. The data structure for master graph map 484 may also include group configurations 484.3 describing each video camera group. For example, each video camera group may include a set of group configuration parameters that may be associated with the master node entry for that group. Example group configuration parameters may include detector types 484.4 describing the object types supported by the object detectors operating in that camera group, camera parameters 484.5 describing the configuration and capabilities of the cameras in the group (e.g., model, memory, operating modes, image capture capabilities, operating schedule, etc.), and/or a group priority threshold 484.6 describing a default priority for responding to regional video alert events. In some configurations, master graph map 484 may be embodied in one or more data structures, such as one or more data tables, lists, databases, or similar data structures for associating structured sets of parameters with video camera groups and/or master nodes 484.1 using graph maps.

Regional event logic 486 may be configured similarly to regional event logic 366 to move some or all of the regional event decision-making to control center computer system 402. Regional event logic 486 may include similar sets of event conditions 486.1, event priority values 486.2, priority thresholds 486.3, and/or sub-region or group selection logic 486.4. For example, regional event logic 486 may receive video event alerts from the master video cameras, evaluate the video event parameters from those video events against event conditions 466.1 and determine corresponding event priority values. Based on priority thresholds 486.3 and/or group priority thresholds 484.6, sub-region selection logic 486.4 may determine one or more other video camera groups to receive a regional video capture update message or similar video event alert.

Update message logic 488 may use master camera interface 482 and message interface 482.1 to send regional video capture update messages for changing the video capture parameters of other video camera groups based on regional video alert events. Update message logic 488 may be configured to generate alert messages for selected master cameras. For example, update message logic 488 may select video event parameter values 488.1 for inclusion in the payload of the alert or notification message. These video event parameters, such as a video sample of the triggering video event, object parameters for the detected object of interest, a last known location (e.g., coordinates of the video camera that captured the video event) and/or direction of travel of the object of interest, may be included in a regional video capture update message for use by the receiving camera groups. Event priority value 488.2 (based on event priority value 486.2 determined by regional event logic 486) may also be included as a parameter of the regional video capture update message. In some configurations, time and other video event metadata may also be included in the regional video capture update message. Update message logic 488 may assemble the message payload and send the message through master camera interface 482 to the master video cameras selected by sub-region selection logic 386.4. In some configurations, as described with regard to FIG. 3, surveillance manager controller 480 may receive a regional video capture update message generated by one of the master video cameras and forward that message to the target other master video cameras. Various other configurations of allocating functions between surveillance manager controller 480 and the surveillance controllers 330 of the master cameras are also possible.

Figure 5A:
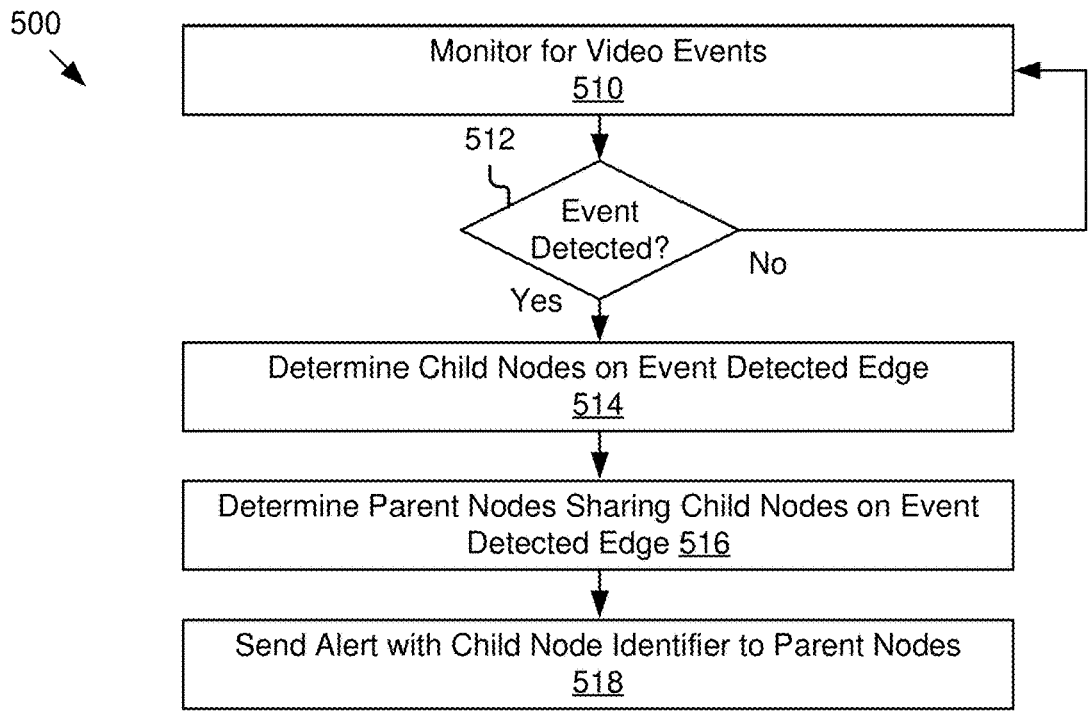
FIG. 5A is a flowchart of an example method of sending an alert based on graph mapped relationships among video cameras.

As shown in FIG. 5A, surveillance system 300 may be operated according to an example method for sending an alert based on graph mapped relationships among video cameras, i.e., according to method 500 illustrated by blocks 510-518 in FIG. 5A.

At block 510, video events may be monitored. For example, each video camera may capture video data and analyze it for objects of interest using an object detection model.

At block 512, whether an event has been detected may be determined. For example, one of the video cameras may detect an object of interest in its video data stream meeting the trigger conditions of its video event detector and method 500 may proceed to block 514. If no event is detected, method 500 may return to block 510 to continue to monitor for video events.

At block 514, child nodes on an event detected edge may be determined. For example, the detecting video camera may determine the event detected edge or event direction from the camera and/or object position and use the event detected edge to determine the child nodes connected to the event detected edge (based on the graph map or a reference table based on the graph map).

At block 516, parent nodes sharing child nodes on the event detected edge may be determined. For example, the set of child nodes determined at block 514 may be used to determine the parent nodes that share an edge connection to one or more of those child nodes.

At block 518, an alert message with the child node identifier may be sent to the parent nodes. For example, the detecting video camera may send a video capture update message including the child node identifier or identifiers for the shared child node or nodes in the event direction to each the video cameras corresponding to each parent node determined at block 516. In some configurations, the master video camera or master node may be considered to share a child node for all of the other video cameras and always receive the alert message.

Figure 5B:
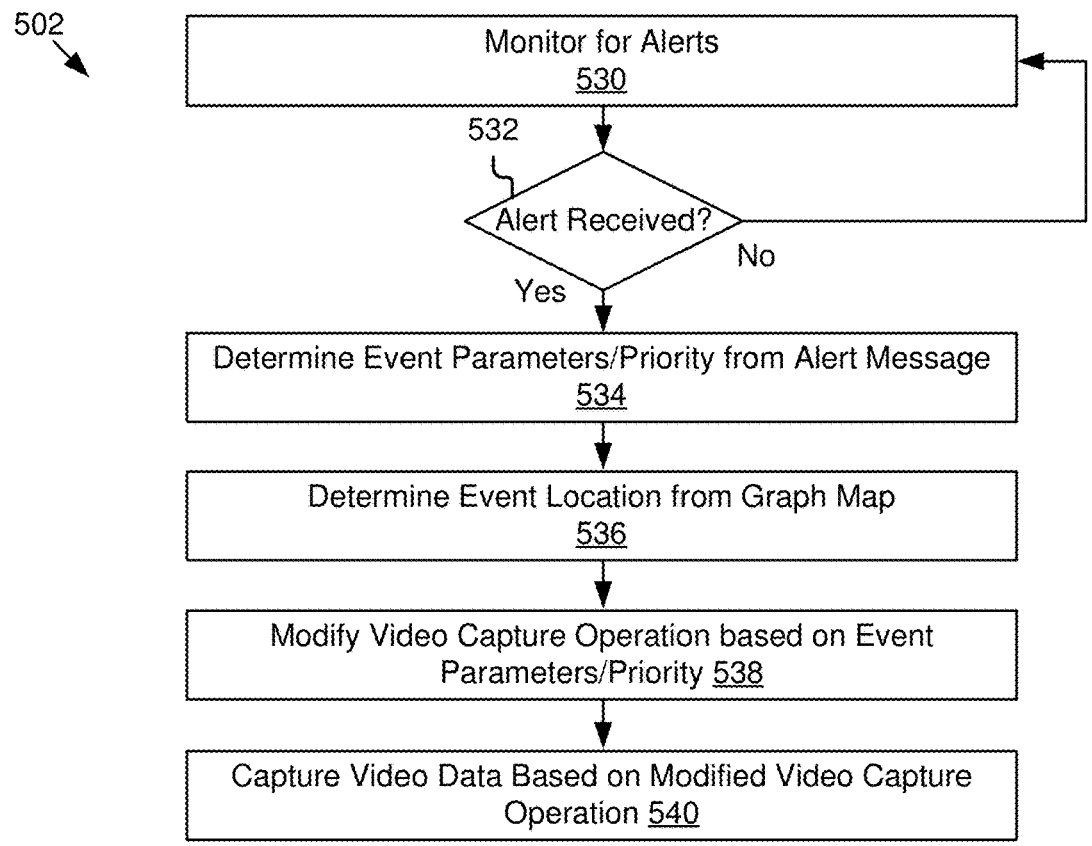
FIG. 5B is a flowchart of an example method of modifying video capture based on event parameters in an alert.

As shown in FIG. 5B, surveillance system 300 may be operated according to an example method for modifying video capture based on event parameters and/or priority in an alert, i.e., according to method 502 illustrated by blocks 530-540 in FIG. 5B.

At block 530, alerts may be monitored. For example, each video camera may monitor for video capture update messages or similar alerts from other video cameras, which may include local alerts based on a regional alert received by the master video camera.

At block 532, whether an alert has been received may be determined. For example, one of the video cameras may detect an object of interest in its video data stream and send an alert according to method 500 or the master video camera may have received a regional alert from another camera group. If an alert is received, method 502 may proceed to block 534. If no alert is received, method 502 may return to block 530 to continue to monitor for alerts.

At block 534, event parameters and/or event priority may be determined from the alert message. For example, the video capture update message may include video event parameters in the message based on the detected video event and each receiving video camera may parse the video event parameters, including event priority, from the message.

At block 536, the event location may be determined based on the graph map. For example, event parameters like the child node identifier may be included in locally generated alerts and/or regionally generated alerts may include video event parameters based on the master graph map and the receiving camera may determine the event location based on those parameters.

At block 538, a modification to video capture operations based on the event parameters and/or event priority may be determined. For example, the receiving camera may be configured with actuator positions and fields of view corresponding to different paths of approach oriented in different directions and the receiving camera may change actuator positions based on the determined event location and/or otherwise modify video capture operations for different video capture rates, object detector configurations, etc.

At block 540, the camera may capture video data based on the modified video capture operation. For example, responsive to the modifications of video capture operations determined at block 538, the receiving camera may initiate video capture in case the object of interest enters its field of view from the direction of the video event detected by another camera (in the group or from a different group).

Figure 6:
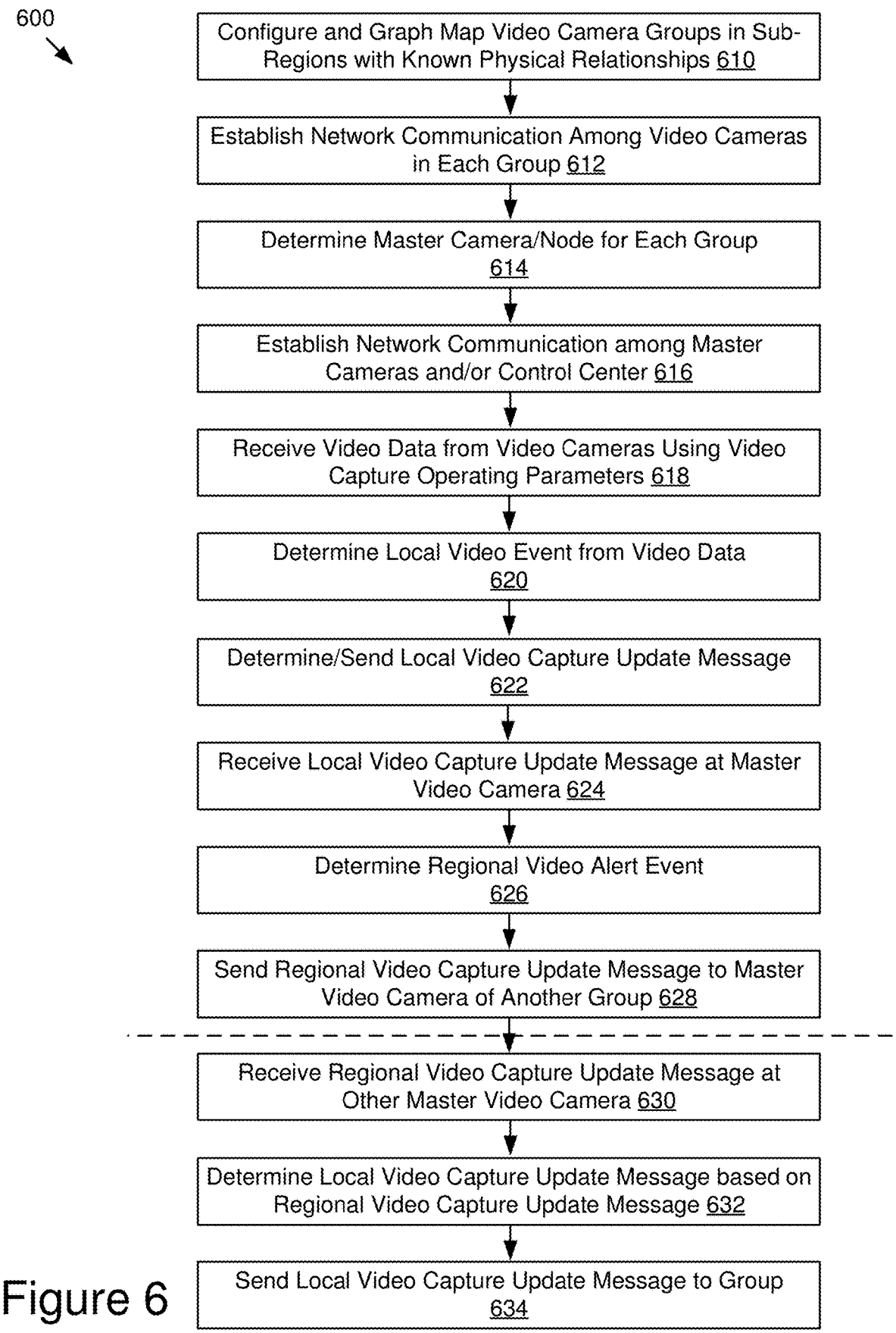
FIG. 6 is a flowchart of an example method of predictive modification of video capture operations among networked video cameras based on a video event detected by one camera group modifying the operation of another camera group.

As shown in FIG. 6, surveillance system 300 may be operated according to an example method for predictive modification of video capture operations among networked video cameras based on a video event detected by one camera group modifying the operation of another camera group, i.e., according to method 600 illustrated by blocks 610-634 in FIG. 6.

At block 610, multiple groups of video cameras may be configured in different sub-regions with known physical relationships among them represented in a graph map. For example, a user may deploy multiple sets of networked video cameras in surveillance locations with fixed positions and fixed or moveable fields of view based on the orientation, size, and depth of field of the image sensors and associated lens(es) and map the cameras and paths for object movement among them on sub-region and master graph maps.

At block 612, network communication may be established among the video cameras in each group. For example, each camera may be configured with a network interface and corresponding network protocols for peer-to-peer communication with at least a master video camera and/or networked to a shared host, such as a network video recorder or control center computer system.

At block 614, a master camera or master node may be determined for each group. For example, when the camera groups are configured, the user may select one video camera from each group to act as the master video camera for that group.

At block 616, network communication may be established among the master video cameras from each group. For example, each master video camera may be configured with their network interface and corresponding network protocols for peer-to-peer communication with the master video cameras from the other groups directly and/or networked to a shared host, such as a network video recorder or control center computer system, for routing communication to the other master video cameras.

At block 618, video data may be received from at least one video camera using a current set of video capture operating parameters. For example, a surveillance controller for the camera may continuously receive video data from the video sensor using the passive video capture rate.

At block 620, a video event may be determined from the video data. For example, the surveillance controller for one of the video cameras may detect an object of interest in its field of view.

At block 622, a local video capture update message may be determined and sent by the video camera to other video cameras in its group. For example, the surveillance controller for the video camera that detected the video event may generate and send an alert message with video event parameters to one or more other video cameras in the group, including the master video camera.

At block 624, the master video camera may receive the local video capture update message. For example, the surveillance controller in the master video camera in the group in which the video event was detected may receive the alert message from camera that detected the event.

At block 626, a regional video alert event may be determined. For example, the surveillance controller for the master video camera may evaluate the video event parameters to determine whether they meet one or more event conditions for raising a regional alert to one or more other video camera groups.

At block 628, a regional video capture update message may be sent to the master video camera in one or more other video camera groups. For example, the surveillance controller of the master video camera may send or route a regional alert message to other master video cameras based on a camera identifier and/or corresponding network address for those master video cameras.

At block 630, the other master video cameras may receive the regional video capture update message. For example, the other master video cameras may receive the message from the originating video camera group through their network interfaces.

At block 632, the other master video cameras may determine corresponding local video update messages based on the regional video capture update message. For example, responsive to the message, the receiving master video camera may evaluate the video event parameters in the message to generate a corresponding local video update message for one or more of the cameras in its group.

At block 634, the local video capture update messages may be sent to their respective camera groups. For example, each master video camera that received the regional video capture update may selectively send the local video update message generated at block 632 to one or more of the video cameras in their group.

Figure 7:
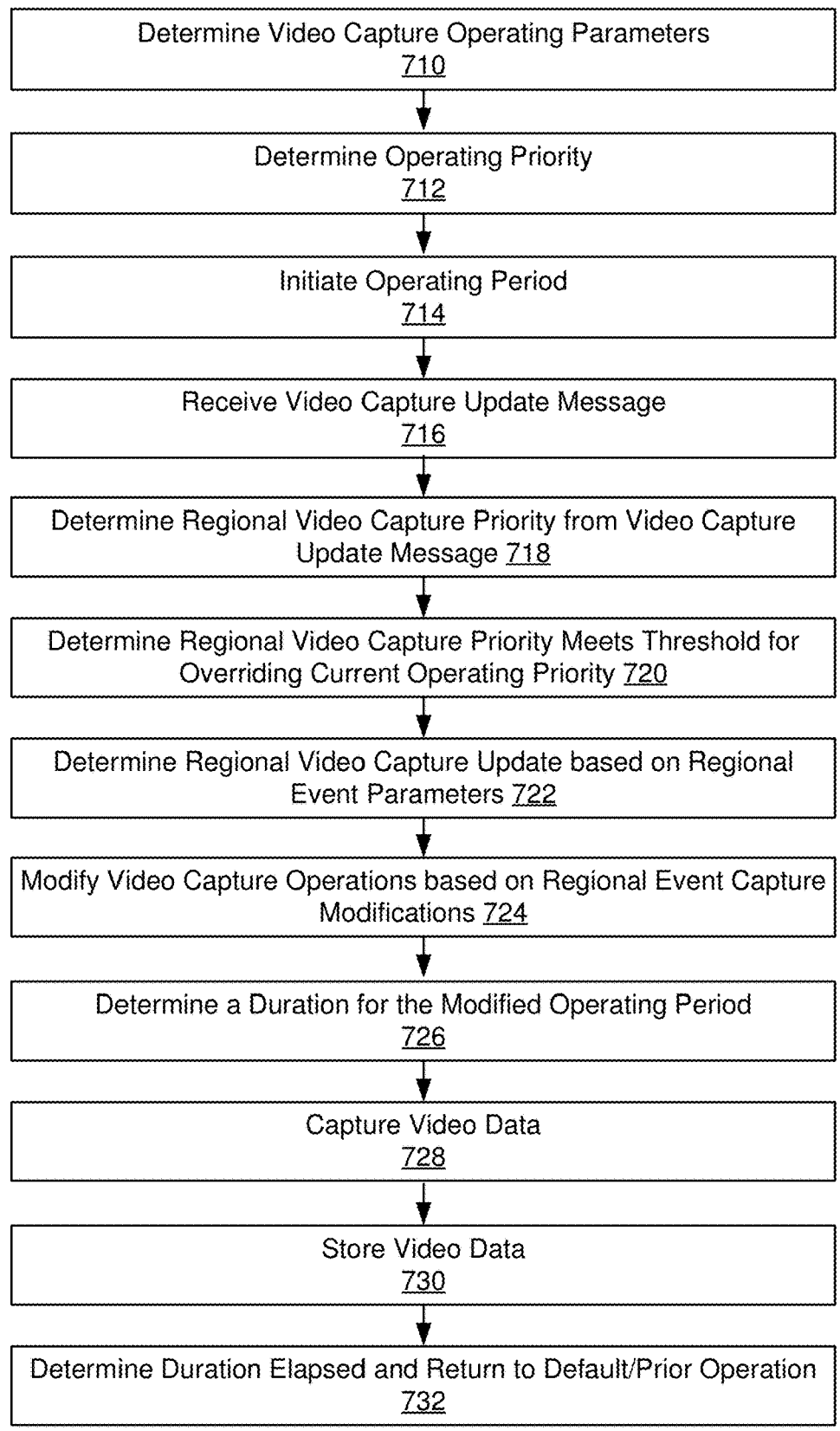
FIG. 7 is a flowchart of an example method of modifying video capture operations based on a video capture update message based on an event detected by another camera group.

As shown in FIG. 7, surveillance system 300 may be operated according to an example method for modifying video capture operations based on a video capture update message based on an event detected by another camera group, i.e., according to method 700 illustrated by blocks 710-732 in FIG. 7. In some embodiments, method 500 may operate in conjunction with one or more blocks of method 600 in FIG. 6.

At block 710, video capture operating parameter may be determined. For example, each video camera in the video camera groups may operate in a default operating mode with a corresponding set of video capture operating parameters and/or may operate in one or video capture modes responsive to a video event that was detected by that camera or was detected in their group.

At block 712, an operating priority may be determined. For example, each video camera operating in its default operating mode may have the lowest operating priority or may be operating in response to a directly detected or local video event in a higher priority state with a corresponding operating priority value.

At block 714, an operating period may be initiated. For example, each video camera may begin operating in their current operating mode and that mode may continue until interrupted by another event, such as the receipt of a video capture update message (or detection of an event in their own environment).

At block 716, a video capture update message may be received. For example, the video camera may receive a video capture update message, such as a local video capture update message based on a regional video update message received by the master video camera for their group.

At block 718, a regional video capture priority may be determined from the video capture update message. For example, the received video capture update message may be based on a regional video capture update message and the receiving camera may parse a regional video event priority value from the video event parameters in the message.

At block 720, that the regional video capture priority meets a threshold for overriding the current operating priority may be determined. For example, the receiving camera may compare the regional video event priority value to their current operating priority value as a threshold for determining whether to override their current video capture operating mode.

At block 722, a regional video capture update may be determined based on regional video event parameters. For example, the receiving camera may parse additional video event parameters from the message to determine what new operating mode and corresponding video capture parameters, such as actuator direction, capture rate, object detector parameters, etc., should be used to interrupt the current operating mode.

At block 724, video capture operations may be modified based on the regional video capture update determined at block 722. For example, the receiving camera may modify its operating mode to support object detection based on the regional video capture update.

At block 726, a duration for the modified operating period may be determined. For example, the video camera may receive or determine a duration to monitor for the object of interest and set a predictive capture timer to measure the elapsed time to the duration.

At block 728, video data may be captured. For example, during the current operating period, the video camera may use the modified video capture operations to capture video data from the video image sensor.

At block 730, video data may be stored. For example, during the current operating period, the video camera may send and store the captured video data for the modified video data operations.

At block 732, the duration for modified video capture operations may be determined to have elapsed and the video camera may return to default video capture operating parameters. For example, if the predetermined duration is met without detecting the object of interest, the video camera may return to block 714 to initiate another operating period with the original set of video capture operating parameters.

Figure 8:
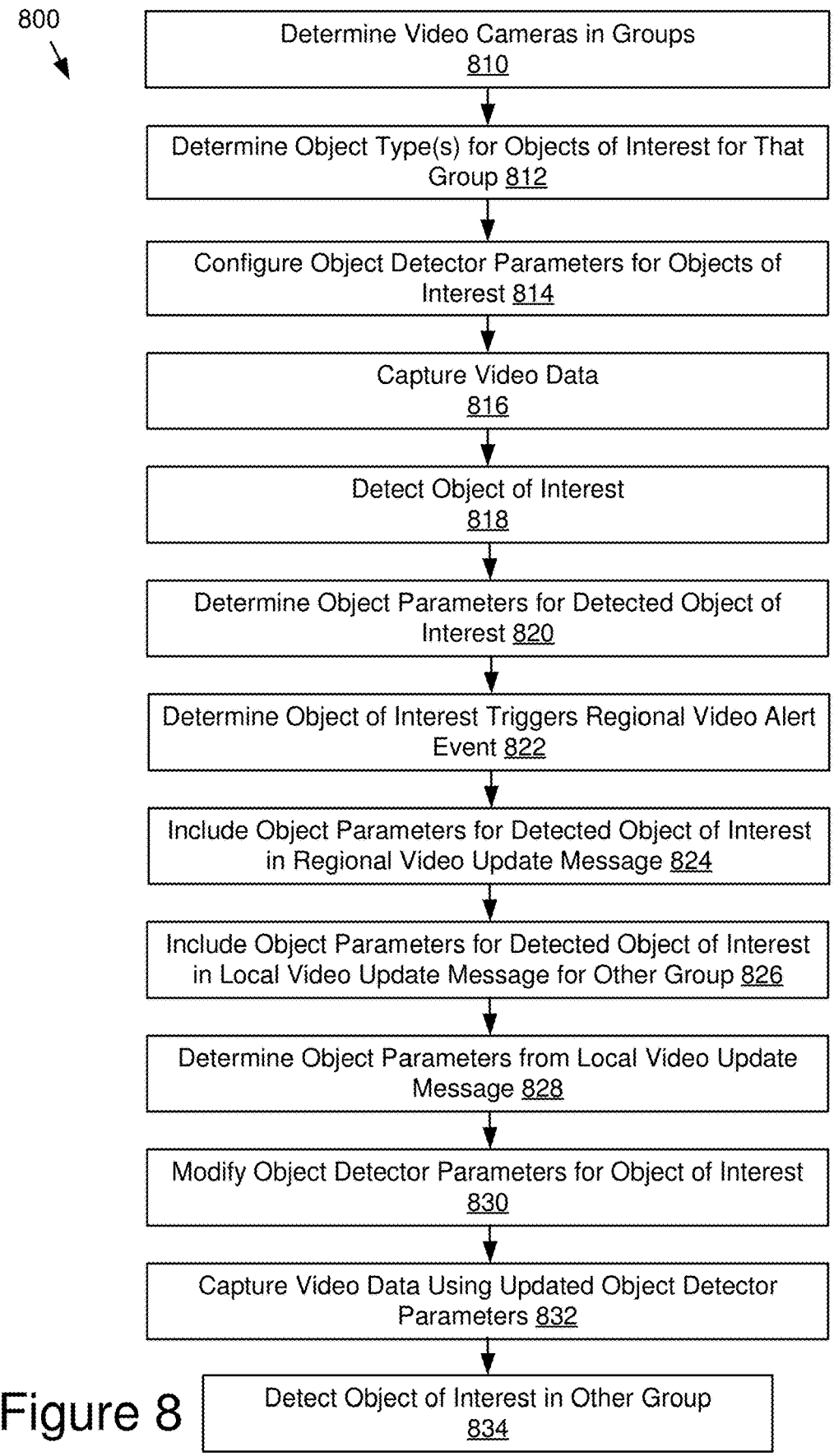
FIG. 8 is a flowchart of an example method of using object detector parameters from one camera group to selectively modify operation of another camera group in response to a detected object of interest.

As shown in FIG. 8, surveillance system 300 may be operated according to an example method for using object detector parameters from one camera group to selectively modify operation of another camera group in response to a detected object of interest, i.e., according to method 800 illustrated by blocks 810-834 in FIG. 8.

At block 810, the sets of video cameras in each group are determined. For example, during installation of a video surveillance system, the installer may group the video cameras being installed in various sub-regions as sub-region sets of networked video cameras.

At block 812, one or more object types may be determined as objects of interest for each group of cameras. For example, each group in the surveillance system may be configured for monitoring people, vehicles, animals, inventory, or one or more other objects of interest.

At block 814, the object detectors may be configured for the objects of interest. For example, each camera may include an object detector of the selected type that is trained for detecting objects of that type meeting specific criteria of interest and determining corresponding object characteristics. The object detectors may be trained directly or loaded with a previously trained object detector model for the objects of interest.

At block 816, video data may be captured. For example, the video camera may operate according to its default video capture operating mode to capture, analyze, and/or store video data from its image sensor.

At block 818, an object of interest may be detected. For example, the video camera may detect an object of the selected object type from its video data.

At block 820, object parameters for the detected object of interest may be determined. For example, the video camera may determine the object type, location, timing, bounding box, size, and other parameters from the object detection, as well as one or more object parameters based on further classification, such as color, sub-type, activity type, etc.

At block 822, that the detected object of interest triggers a regional video alert event may be determined. For example, the detecting camera, corresponding master camera, and/or control center may determine that the detected object meets one or more conditions for a regional video alert event.

At block 824, object parameters for the detected object of interest may be included in a regional video capture update message. For example, the master camera or control center computer system may generate a regional video capture update message and include one or more object parameters from the detected video event, such object type and other parameters, extracted video data of the detected object (such as frames or bounding box contents), and/or object detector parameters used to detect the object.

At block 826, object parameters for the detected object of interest may be included in a local video capture update message. For example, a master camera receiving the regional video capture update message may generate a local video capture update message and include one or more object parameters from the regional video capture update message.

At block 828, object parameters may be determined from the local video update message. For example, the video cameras in the receiving group may parse the object parameters from the local video capture update message sent by their master camera.

At block 830, object detector parameters may be modified for the object of interest. For example, the video cameras in the receiving group may change their object detector parameters to adjust or prioritize the object type and/or other characteristics of the object of interest to increase the likelihood of detection of the object of interest.

At block 832, video data may be captured using the updated object detector parameters. For example, the receiving video cameras may enter an operating mode using the object detector parameters from block 830.

At block 834, the object of interest may be detected in another group. For example, one or more of the receiving video cameras may successfully detect the object of interest when it enters its field of view using the updated object detection parameters and return a corresponding alert message.

Figure 9:
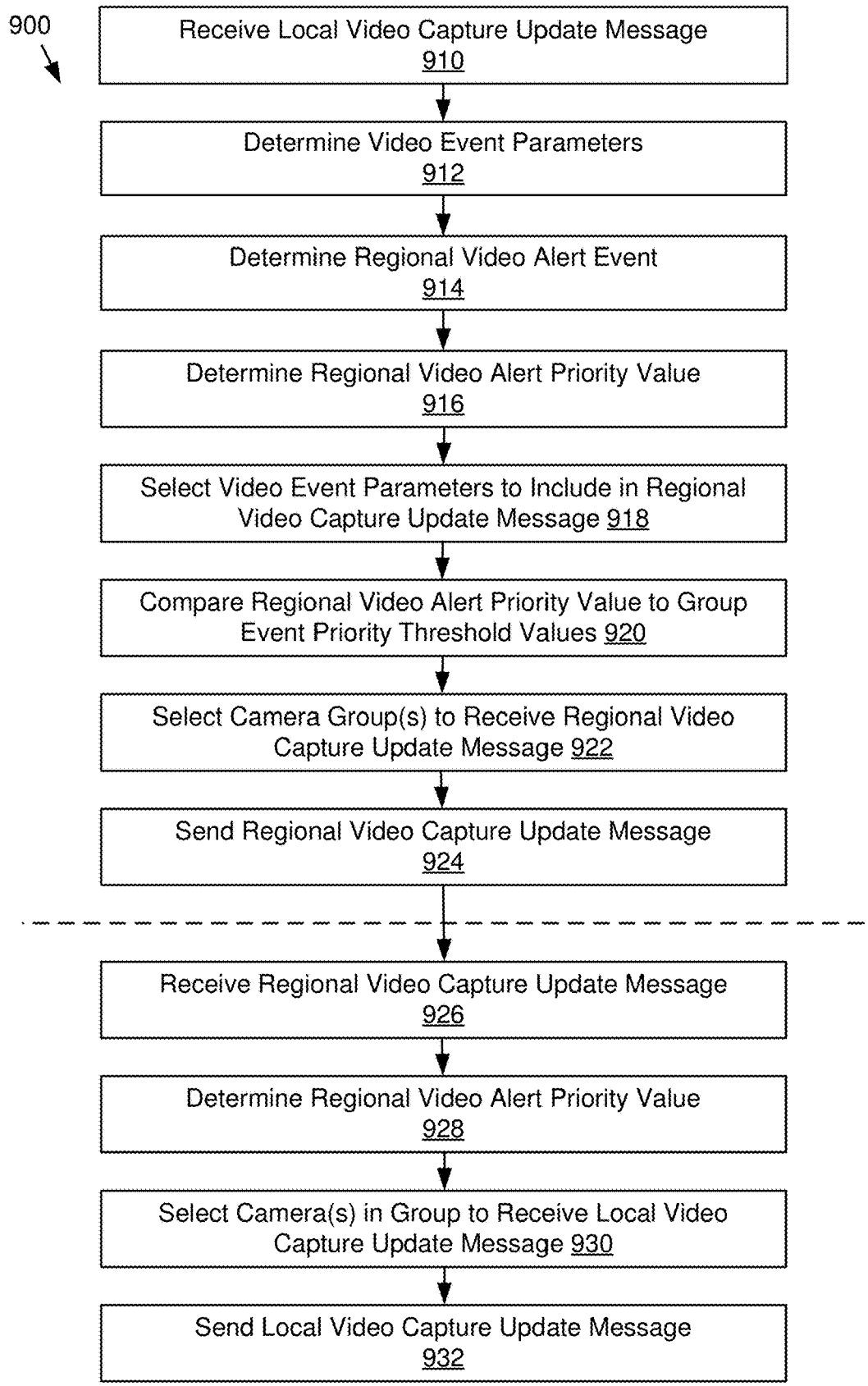
FIG. 9 is a flowchart of an example method of generating and using regional video capture update messages.

As shown in FIG. 9, surveillance system 300 may be operated according to an example method for generating and using regional video capture update messages, i.e., according to method 900 illustrated by blocks 910-932 in FIG. 9. In some configurations, some or all of blocks 910-924 may be executed by a control center computer system rather than the master video camera for the group that detected the event.

At block 910, a local video capture update message may be received. For example, a master video camera may receive a local video capture update message from one of the video cameras in its group based on its sub-region graph map.

At block 912, video event parameters may be determined. For example, based on the local video capture update message, the master video camera may determine a set of video event parameters for the local video event that generated the local video capture update message.

At block 914, a regional video alert event may be determined. For example, the master video camera may evaluate the set of video event parameters against one or more conditions for triggering a regional video alert event.

At block 916, a regional video alert priority value may be determined. For example, the master video camera may use one or more conditions for triggering the regional video alert event to assign or generate an event priority value for the local video event.

At block 918, video event parameters may be selected to include in a regional video capture update message. For example, the master video camera may select some or all of the video event parameters included in the local video capture update message to include in the regional video capture update message and may include the regional video alert priority value.

At block 920, the regional video alert priority value may be compared to group event priority threshold values. For example, each camera group may be assigned a threshold priority value to receiving a regional video alert and the master video camera may compare the regional video alert priority value to each other group's priority threshold value.

At block 922, camera groups may be selected to receive the regional video capture update message. For example, the master video camera may select the other groups to receive the regional alert based on the comparison at block 920, where the alert priority value meets that group's priority threshold value.

At block 924, regional video capture update messages may be sent. For example, the master video camera may send the generated regional video capture update message to the master video cameras of the selected groups.

At block 926, the regional video capture update message may be received by the other camera groups. For example, the master video cameras in the other camera groups selected at block 922 may receive the regional video capture update message.

At block 928, the regional video alert priority value may be determined. For example, the receiving master video cameras may parse the regional video alert priority value from the regional video capture update message.

At block 930, cameras in the group may be selected to receive a corresponding local video capture update message. For example, based on the regional video alert priority value and/or other video event parameters in the regional video capture update message, the receiving master video camera may determine which other video cameras in the group should receive a local video capture update message based on the regional video capture update message.

At block 932, the local video capture update message may be sent to video cameras in the group. For example, the receiving master video camera may send the local video capture update message to the other cameras in the group selected at block 930.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Any combination of processors, CPUs, controllers, or similar hardware circuits may be used to execute instructions stored on computer-readable mediums. For example, processors, CPUs, controllers, and similar hardware circuits described herein may be embodied in or include one or more hardware processor packages and/or processor cores that operate alone or in combination to execute instructions and carry out the described functions. In some configurations, these processors or groups of processors may be standalone circuits in their own package, integrated with other hardware elements in a system on a chip (SOC), application specific integrated circuit (ASIC), or similar device, and/or integrated through a communication bus in a printed circuit board assembly (PCBA).

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
  a first video camera comprising a network interface configured for communication with:
    a first plurality of networked video cameras, wherein the first plurality of networked video cameras includes the first video camera; and
    a second video camera among a second plurality of networked video cameras; and
  at least one controller in communication with the first plurality of networked video cameras and the second video camera, the at least one controller configured to, alone or in combination:
    receive, based on a first graph map of the first plurality of networked video cameras, a first video capture update message from at least one video camera in the first plurality of networked video cameras, wherein the first graph map comprises:
      a first coordinate position system;
      a first set of coordinates for the first video camera;
      a second set of coordinates for each other video camera in the first plurality of networked video cameras; and
      a third set of coordinates for each child node between video cameras of the first plurality of networked video cameras, wherein each child node is mapped to at least two parent nodes for corresponding video cameras of the first plurality of networked video cameras;
    determine, based on the first video capture update message, a regional video alert event; and
    send, based on the regional video alert event, a second video capture update message to the second video camera, wherein:
      the second video camera is configured to send, responsive to the second video capture update message and based on a second graph map of the second plurality of networked video cameras, a third video capture update message to at least one other video camera from the second plurality of networked video cameras; and
      the second graph map comprises:
        a second coordinate position system;
        a fourth set of coordinates for the second video camera;
        a fifth set of coordinates for each other video camera in the second plurality of networked video cameras; and
        a sixth set of coordinates for each child node between video cameras of the second plurality of networked video cameras, wherein each child node is mapped to at least two parent nodes for corresponding video cameras of the second plurality of networked video cameras.

2. The system of claim 1, further comprising:
the first plurality of networked video cameras, wherein each video camera of the first plurality of networked video cameras is configured to, responsive to receiving the first video capture update message:
determine at least one event parameter from the first video capture update message;
modify, based on the at least one event parameter, a video capture operation of that video camera in the first plurality of networked video cameras; and
capture, using that video camera, video data based on the modified video capture operation.

3. The system of claim 1, further comprising:
the second plurality of networked video cameras, wherein each video camera of the second plurality of networked video cameras is configured to, responsive to receiving the third video capture update message:
determine regional video capture modifications from the third video capture update message;

modify, based on the regional video capture modifications, a video capture operation of that video camera in the second plurality of networked video cameras; and capture, using that video camera, video data based on the modified video capture operation.

4. The system of claim 1, wherein:

the first video camera is a master camera for the first plurality of networked video cameras and configured for network communication with the second video camera and no other video camera in the second plurality of networked video cameras; and the second video camera is a master camera for the second plurality of networked video cameras and configured for network communication with the first video camera and no other video camera in the first plurality of networked video cameras.

5. The system of claim 1, wherein the first coordinate position system and the second coordinate position system are different.

6. The system of claim 1, wherein:

at least one video camera in the first plurality of networked video cameras comprises a first object detector configured to detect a first object of interest in video data captured by that video camera;

at least one video camera in the second plurality of networked video cameras comprises a second object detector configured to detect a second object of interest in video data captured by that video camera;

the first video capture update message is responsive to detection of the first object of interest;

the second video capture update message comprises at least one parameter of the first object of interest; and the at least one video camera in the second plurality of networked video cameras is configured to modify, responsive to the third video capture update message, at least one operating parameters of the second object detector to detect the first object of interest in the video data captured by that video camera.

7. The system of claim 1, wherein:

the second video capture update message comprises at least one parameter selected from:

a sample of video data for the regional video alert event;

coordinates of the video camera in the first plurality of networked video cameras that captured the regional video alert event; and a direction of travel of an object of interest determined for the regional video alert event; and the at least one controller is further configured to, alone or in combination, determine the second plurality of networked video cameras and the second video camera based on the at least one parameter selected.

8. The system of claim 1, further comprising:

the first plurality of networked video cameras corresponding to a first sub-region mapped to first set of physical locations;

the second plurality of networked video cameras corresponding to a second sub-region mapped to a second set of physical locations; and a third plurality of networked video cameras corresponding to a third sub-region mapped to a third set of physical locations, wherein:

the first graph map is based on the first set of physical locations;

the second graph map is based on the second set of physical locations;

a third graph map corresponds to the third plurality of networked video cameras and is based on the third set of physical locations; and the at least one controller is further configured to, alone or in combination, select, based on the video regional alert event, between the second plurality of networked video cameras and the third plurality of networked video cameras to receive the second video capture update message.

9. The system of claim 1, wherein:

the at least one controller is further configured to, alone or in combination:

determine, based on the regional video alert event, a priority value of the regional video alert event;

compare the priority value to at least one event priority threshold; and select, responsive to the priority value meeting at least one event priority threshold, at least one plurality of networked video cameras from a set of pluralities of networked video cameras including the second plurality of networked video cameras;

the second video capture update message includes the priority value; and the second plurality of networked video cameras is further configured to selectively modify, based on the priority value, video capture operations.

10. The system of claim 1, further comprising:

a computer system remote from the first plurality of networked video cameras and the second plurality of networked video cameras, wherein:

the computer system comprises:

a plurality of graph maps corresponding to a plurality of sub-region sets of networked video cameras;

a network interface configured for communication with a master camera in each sub-region set of the plurality of sub-region sets; and the at least one controller;

the first plurality of networked video cameras is a first sub-region set corresponding to a first set of physical locations monitored by the computer system;

the first video camera is the master camera for the first plurality of networked video cameras;

the second plurality of networked video cameras is a second sub-region set corresponding to a second set of physical location monitored by the computer system; and the second video camera is the master camera for the second plurality of networked video cameras.

11. A computer-implemented method, comprising:

receiving, from a first video camera in a first plurality of networked video cameras and based on a first graph map of the first plurality of networked video cameras, a first video capture update message from at least one video camera in the first plurality of networked video cameras;

determining, based on the first video capture update message, a regional video alert event;

determining, based on the regional video alert event, a priority value of the regional video alert event;

comparing the priority value to at least one event priority threshold;

selecting, responsive to the priority value meeting the at least one event priority threshold, a second plurality of networked video cameras from a set of pluralities of networked video cameras including the second plurality of networked video cameras;

sending, to a second video camera in a second plurality of networked video cameras and based on the regional video alert event, a second video capture update message, wherein the second video capture update message includes the priority value;

sending, by the second video camera and responsive to the second video capture update message, a third video capture update message to at least one other video camera from the second plurality of networked video cameras based on a second graph map of the second plurality of networked video cameras; and selectively modifying, by the at least one video camera in the second plurality of network video cameras and based on the priority value, video capture operations.

12. The computer-implemented method of claim 11, further comprising, responsive to receiving the first video capture update message and by at least one video camera in the first plurality of networked video cameras:

determining at least one event parameter from the first video capture update message;

modifying, based on the at least one event parameter, a video capture operation of that video camera in the first plurality of networked video cameras; and capturing, using that video camera, video data based on the modified video capture operation.

13. The computer-implemented method of claim 11, further comprising, responsive to receiving the third video capture update message and by at least one video camera of the second plurality of networked video cameras:

determining regional video capture modifications from the third video capture update message;

modifying, based on the regional video capture modifications, a video capture operation of that video camera in the second plurality of networked video cameras; and capturing, using that video camera, video data based on the modified video capture operation.

14. The computer-implemented method of claim 11, wherein:

the first graph map comprises:
a first coordinate position system;
a first set of coordinates for the first video camera;
a second set of coordinates for each other video camera in the first plurality of networked video cameras; and
a third set of coordinates for each child node between video cameras of the first plurality of networked video cameras, wherein each child node is mapped to at least two parent nodes for corresponding video cameras of the first plurality of networked video cameras; and the second graph map comprises:
a second coordinate position system;
a fourth set of coordinates and a master indicator for the second video camera;
a fifth set of coordinates for each other video camera in the second plurality of networked video cameras; and
a sixth set of coordinates for each child node between video cameras of the second plurality of networked video cameras, wherein each child node is mapped to at least two parent nodes for corresponding video cameras of the second plurality of networked video cameras.

15. The computer-implemented method of claim 14, wherein the first coordinate position system and the second coordinate position system are different.

16. The computer-implemented method of claim 11, further comprising:

detecting, by at least one video camera in the first plurality of networked video cameras and using a first object detector, a first object of interest in video data captured by that video camera; and modifying, by at least one video camera in the second plurality of networked video cameras and responsive to the third video capture update message, at least one operating parameters of a second object detector to detect the first object of interest in the video data captured by that video camera, wherein:

the first video capture update message is responsive to detection of the first object of interest; and the second video capture update message comprises at least one parameter of the first object of interest.

17. The computer-implemented method of claim 11, further comprising:

including, in the second video capture update message, at least one parameter selected from:
a sample of video data for the regional video alert event;
coordinates of the video camera in the first plurality of networked video cameras that captured the regional video alert event; and
a direction of travel of an object of interest determined for the regional video alert event; and determining, based on the at least one parameter selected, the second plurality of networked video cameras and the second video camera.

18. The computer-implemented method of claim 11, further comprising:

selecting, based on the video regional alert event, between the second plurality of networked video cameras and a third plurality of networked video cameras to receive the second video capture update message, wherein:

the first plurality of networked video cameras corresponding to a first sub-region mapped to first set of physical locations;

the second plurality of networked video cameras corresponding to a second sub-region mapped to a second set of physical locations;

the third plurality of networked video cameras corresponding to a third sub-region mapped to a third set of physical locations;

the first graph map is based on the first set of physical locations;

the second graph map is based on the second set of physical locations; and a third graph map corresponds to the third plurality of networked video cameras and is based on the third set of physical locations.

19. The computer-implemented method of claim 11, wherein:

the first video camera is a master camera for the first plurality of networked video cameras and configured for network communication with the second video camera and no other video camera in the second plurality of networked video cameras; and the second video camera is a master camera for the second plurality of networked video cameras and configured for network communication with the first video camera and no other video camera in the first plurality of networked video cameras.

20. A system, comprising:
a first plurality of networked video cameras including a first video camera;

a second plurality of networked video cameras including a second video camera;
at least one processor;
at lease one memory;
means for receiving, from the first video camera and based on a first graph map of the first plurality of networked video cameras, a first video capture update message from at least one video camera in the first plurality of networked video cameras, wherein the first graph map comprises:
a first coordinate position system;
a first set of coordinates for the first video camera;
a second set of coordinates for each other video camera in the first plurality of networked video cameras; and
a third set of coordinates for each child node between video cameras of the first plurality of networked video cameras, wherein each child node is mapped to at least two parent nodes for corresponding video cameras of the first plurality of networked video cameras;
means for determining, based on the first video capture update message, a regional video alert event;
means for sending, to the second video camera and based on the regional video alert event, a second video capture update message; and
means for sending, by the second video camera and responsive to the second video capture update message, a third video capture update message to at least one other video camera from the second plurality of networked video cameras based on a second graph map of the second plurality of networked video cameras, wherein the second graph map comprises:
a second coordinate position system;
a fourth set of coordinates for the second video camera;
a fifth set of coordinates for each other video camera in the second plurality of networked video cameras; and
a sixth set of coordinates for each child node between video cameras of the second plurality of networked video cameras, wherein each child node is mapped to at least two parent nodes for corresponding video cameras of the second plurality of networked video cameras.

* * * * *